United States Patent
Bapst et al.

(10) Patent No.: US 12,549,627 B2
(45) Date of Patent: Feb. 10, 2026

(54) INTELLIGENT CLOUD-EDGE RESOURCE MANAGEMENT

(71) Applicant: QUALCOMM Incorporated, San Diego, CA (US)

(72) Inventors: Mark Bapst, South Barrington, IL (US); Bibhu Mohanty, Del Mar, CA (US); Gad Karmi, Davis, CA (US); Jay Rodney Walton, Waban, MA (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 18/064,909

(22) Filed: Dec. 12, 2022

(65) Prior Publication Data

US 2024/0195867 A1  Jun. 13, 2024

(51) Int. Cl.
*H04L 67/101* (2022.01)
*H04L 41/5009* (2022.01)
*H04L 67/1008* (2022.01)

(52) U.S. Cl.
CPC ........ *H04L 67/101* (2013.01); *H04L 41/5009* (2013.01); *H04L 67/1008* (2013.01)

(58) Field of Classification Search
CPC ............... H04L 67/101; H04L 41/5009; H04L 67/1008
See application file for complete search history.

(56) References Cited

U.S. PATENT DOCUMENTS

2017/0201585 A1  7/2017  Doraiswamy et al.
2017/0279881 A1*  9/2017  Chang .................... H04L 65/80
2020/0195495 A1*  6/2020  Parker .................... H04L 41/40
2020/0382445 A1  12/2020  Calmon et al.
2022/0239507 A1  7/2022  Smith et al.
(Continued)

FOREIGN PATENT DOCUMENTS

CN          112187859 B        5/2022

OTHER PUBLICATIONS

Anonymous: "KubeEdge Documentation", Release 0.1, Mar. 15, 2021, 154 Pages, XP093118656.

(Continued)

*Primary Examiner* — Ryan J Jakovac
(74) *Attorney, Agent, or Firm* — Holland & Hart LLP/Qualcomm

(57) ABSTRACT

This disclosure provides systems, methods and apparatuses for intelligent cloud-edge resource management. An end device may provide edge nodes of an edge computing system with network link information, which may enable the edge nodes to schedule and distribute task workloads more effectively, providing greater performance, power, security, and mission-critical network availability. For example, if the end device transmits a processing task request to a first edge node, the first edge node may assign the processing task to a second edge node according to the network link information. Additionally, or alternatively, the end device may transmit an indication of processing task parameters to one or more edge nodes and may receive an indication of an estimated completion time of the processing task from the one or more edge nodes. Accordingly, the end device may assign the processing task to an edge node with the lowest completion time.

34 Claims, 11 Drawing Sheets

(56) References Cited

U.S. PATENT DOCUMENTS

2022/0247651 A1\* 8/2022 Kerpez .............. H04L 43/0864

OTHER PUBLICATIONS

International Search Report and Written Opinion—PCT/US2023/036655—ISA/EPO—Jan. 31, 2024.
Malazi H.T., et al., "Dynamic Service Placement in Multi-Access Edge Computing: A Systematic Literature Review", IEEE Access, vol. 10, Jan. 2022, pp. 32639-32688, XP093118662, USA, p. 32639-p. 32645, p. 32665, p. 32675.
Rahman T., et al., "Efficient Edge Nodes Reconfiguration and Selection for the Internet of Things", IEEE Sensors Journal, vol. 19, No. 12, Jun. 15, 2019, pp. 4672-4679.
Sarieddine K., et al., "An Opportunistic Vehicle-Based Task Assignment for IoT offloading", Computer Networks, vol. 212, Jul. 20, 2022, 109038, Science Direct, pp. 1-7.

\* cited by examiner

INTELLIGENT CLOUD-EDGE RESOURCE MANAGEMENT

TECHNICAL FIELD

This disclosure relates to wireless communications, including intelligent cloud-edge resource management.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in an apparatus for edge compute resource orchestration of end device processing tasks at a first edge node. The apparatus may include one or more interfaces. The one or more interfaces may be configured to obtain, from an end device, network link information associated with one or more wireless communication links between the end device and one or more edge nodes. The one or more interfaces may be further configured to obtain, from the end device, a request associated with a processing task, where the request indicates one or more parameters associated with the processing task. The one or more interfaces may be further configured to output, to a second edge node of the one or more edge nodes, an indication of an assignment of the processing task to the second edge node in accordance with the network link information and the one or more parameters associated with the processing task.

Another innovative aspect of the subject matter described in this disclosure can be implemented in a method for edge compute resource orchestration of end device processing tasks at a first edge node. The method may include receiving, from an end device, network link information associated with one or more wireless communication links between the end device and one or more edge nodes. The method may further include receiving, from the end device, a request associated with a processing task, where the request indicates one or more parameters associated with the processing task. The method may further include transmitting, to a second edge node of the one or more edge nodes, an indication of an assignment of the processing task to the second edge node in accordance with the network link information and the one or more parameters associated with the processing task.

Another innovative aspect of the subject matter described in this disclosure can be implemented in an apparatus for edge compute resource orchestration of end device processing tasks at a first edge node. The apparatus may include means for receiving, from an end device, network link information associated with one or more wireless communication links between the end device and one or more edge nodes. The apparatus may further include means for receiving, from the end device, a request associated with a processing task, where the request indicates one or more parameters associated with the processing task. The apparatus may further include means for transmitting, to a second edge node of the one or more edge nodes, an indication of an assignment of the processing task to the second edge node in accordance with the network link information and the one or more parameters associated with the processing task.

Another innovative aspect of the subject matter described in this disclosure can be implemented in a non-transitory computer-readable medium storing code for edge compute resource orchestration of end device processing tasks at a first edge node. The code may include instructions executable by a processor to receive, from an end device, network link information associated with one or more wireless communication links between the end device and one or more edge nodes. The instructions may be further executable by the processor to receive, from the end device, a request associated with a processing task, where the request indicates one or more parameters associated with the processing task. The instructions may be further executable by the processor to transmit, to a second edge node of the one or more edge nodes, an indication of an assignment of the processing task to the second edge node in accordance with the network link information and the one or more parameters associated with the processing task.

Some implementations of the methods, apparatuses, and non-transitory computer-readable media described herein may further include operations, features, means, or instructions for transmitting coherency information to the one or more edge nodes to maintain coherency across the one or more edge nodes if the first edge node goes offline or becomes disconnected from the one or more edge nodes.

Some implementations of the methods, apparatuses, and non-transitory computer-readable media described herein may further include operations, features, means, or instructions for transmitting, to each of the one or more edge nodes, an indication of the one or more parameters associated with the processing task.

Some implementations of the methods, apparatuses, and non-transitory computer-readable media described herein may further include operations, features, means, or instructions for receiving, from one or more of the one or more edge nodes, an indication of an expected completion time for the processing task, where the assignment of the processing task to the second edge node is according to the expected completion time.

Another innovative aspect of the subject matter described in this disclosure can be implemented in an apparatus for edge compute resource orchestration of processing tasks at an end device. The apparatus may include one or more interfaces. The one or more interfaces may be configured to output network link information associated with one or more wireless communication links between the end device and one or more edge nodes. The one or more interfaces may be further configured to output a request associated with a processing task to at least a first edge node of the one or more edge nodes, where the request indicates one or more parameters associated with the processing task. The one or more interfaces may be further configured to obtain information associated with the processing task from a second edge node of the one or more edge nodes in accordance with the network link information and the one or more parameters associated with the processing task.

Another innovative aspect of the subject matter described in this disclosure can be implemented in a method for edge compute resource orchestration of processing tasks at an end device. The method may include transmitting network link information associated with one or more wireless communication links between the end device and one or more edge nodes. The method may further include transmitting a request associated with a processing task to at least a first edge node of the one or more edge nodes, where the request indicates one or more parameters associated with the processing task. The method may further include receiving information associated with the processing task from a second edge node of the one or more edge nodes in accordance with the network link information and the one or more parameters associated with the processing task.

Another innovative aspect of the subject matter described in this disclosure can be implemented in an apparatus for edge compute resource orchestration of processing tasks at an end device. The apparatus may include means for transmitting network link information associated with one or more wireless communication links between the end device and one or more edge nodes. The apparatus may further include means for transmitting a request associated with a processing task to at least a first edge node of the one or more edge nodes, where the request indicates one or more parameters associated with the processing task. The apparatus may further include means for receiving information associated with the processing task from a second edge node of the one or more edge nodes in accordance with the network link information and the one or more parameters associated with the processing task.

Another innovative aspect of the subject matter described in this disclosure can be implemented in a non-transitory computer-readable medium storing code for edge compute resource orchestration of processing tasks at an end device. The code may include instructions executable by a processor to transmit network link information associated with one or more wireless communication links between the end device and one or more edge nodes. The instructions may be further executable by the processor to transmit a request associated with a processing task to at least a first edge node of the one or more edge nodes, where the request indicates one or more parameters associated with the processing task. The instructions may be further executable by the processor to receive information associated with the processing task from a second edge node of the one or more edge nodes in accordance with the network link information and the one or more parameters associated with the processing task.

Some implementations of the methods, apparatuses, and non-transitory computer-readable media described herein may further include operations, features, means, or instructions for transmitting an indication that the end device has selected the first edge node to be a resource management node for the end device, where selection of the first edge node is in accordance with at least one of a quality metric associated with a wireless communication link between the first edge node and the end device, a compute resource availability of the first edge node, a mobility status of the first edge node, a power type associated with the first edge node, respective distances between the end device and the one or more edge nodes, or respective signal qualities associated with the one or more wireless communication links between the end device and the one or more edge nodes.

In some implementations of the methods, apparatuses, and non-transitory computer-readable media described herein, the network link information indicates at least one of a topology (such as an updated topology) for the one or more wireless communication links, an aggregated processing capability of the one or more edge nodes, quality metrics associated with the one or more wireless communication links, a battery level of the one or more edge nodes, a power connection status of the one or more edge nodes, workload information associated with the one or more edge nodes, or predictive topology changes associated with the one or more wireless communication links.

Another innovative aspect of the subject matter described in this disclosure can be implemented in an apparatus for edge compute resource orchestration of end device processing tasks at a second edge node. The apparatus may include one or more interfaces. The one or more interfaces may be configured to obtain, from a first edge node of one or more edge nodes or an end device, an indication of an assignment of a processing task to the second edge node, where the assignment of the processing task to the second edge node is according to one or more parameters associated with the processing task and network link information associated with one or more wireless communication links between the one or more edge nodes and the end device. The one or more interfaces may be further configured to output, to one or both of the first edge node or the end device, information associated with the processing task in accordance with the one or more parameters associated with the processing task.

Another innovative aspect of the subject matter described in this disclosure can be implemented in a method for edge compute resource orchestration of end device processing tasks at a second edge node. The method may include receiving, from a first edge node of one or more edge nodes or an end device, an indication of an assignment of a processing task to the second edge node, where the assignment of the processing task to the second edge node is according to one or more parameters associated with the processing task and network link information associated with one or more wireless communication links between the one or more edge nodes and the end device. The method may further include transmitting, to one or both of the first edge node or the end device, information associated with the processing task in accordance with the one or more parameters associated with the processing task.

Another innovative aspect of the subject matter described in this disclosure can be implemented in an apparatus for edge compute resource orchestration of end device processing tasks at a second edge node. The apparatus may include means for receiving, from a first edge node of one or more edge nodes or an end device, an indication of an assignment of a processing task to the second edge node, where the assignment of the processing task to the second edge node is according to one or more parameters associated with the processing task and network link information associated with one or more wireless communication links between the one or more edge nodes and the end device. The apparatus may further include means for transmitting, to one or both of the first edge node or the end device, information associated with the processing task in accordance with the one or more parameters associated with the processing task.

Another innovative aspect of the subject matter described in this disclosure can be implemented in a non-transitory computer-readable medium storing code for edge compute resource orchestration of end device processing tasks at a second edge node. The code may include instructions executable by a processor to receive, from a first edge node of one or more edge nodes or an end device, an indication of an assignment of a processing task to the second edge node, where the assignment of the processing task to the second edge node is according to one or more parameters associated with the processing task and network link information associated with one or more wireless communication links between the one or more edge nodes and the end device. The instructions may be further executable by the processor to transmit, to one or both of the first edge node or the end device, information associated with the processing task in accordance with the one or more parameters associated with the processing task.

In some implementations of the methods, apparatuses, and non-transitory computer-readable media described herein, the one or more parameters include at least one of a quality of service (QoS) threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

In some implementations of the methods, apparatuses, and non-transitory computer-readable media described herein, the second edge node queues the processing task in a processing pipeline of the second edge node in accordance with receiving the indication of the assignment of the processing task to the second edge node.

Another innovative aspect provides a computer program comprising instructions that, when executed by a processor, cause the processor to perform the innovative features disclosed herein.

Another innovative aspect provides an apparatus comprising a processing system capable of and configured to perform the innovative features disclosed herein.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
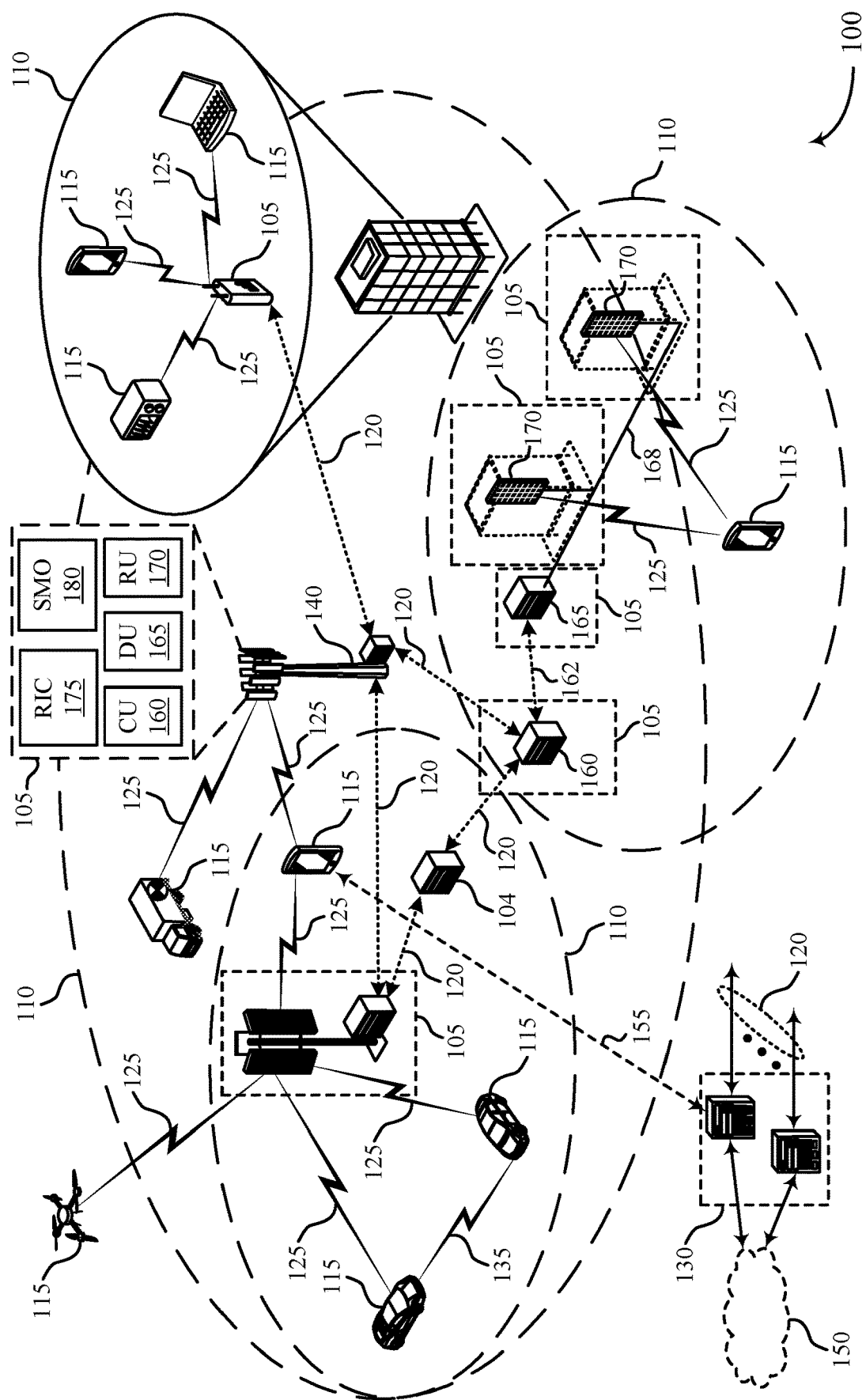
FIG. 1 shows an example wireless communications system that supports intelligent cloud-edge resource management.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing third generation (3G), fourth generation (4G), fifth generation (5G), or sixth generation (6G), or further implementations thereof, technology.

An edge computing system may include a variety of communication devices that are capable of obtaining, exchanging, and processing data. These communication devices may, in some implementations, be referred to as end devices, edge nodes, cloud edges, cloud entities, or the like. The terms "end device" and "edge node" may be relative terms that define or are associated with a relationship between two communication devices with respect to one or more of device capability, task execution, or proximity to a core network or core processing entity. For example, an end device may refer to a communication device with relatively fewer processing resources or reduced processing capabilities, while an edge node may refer to a communication device with relatively more processing resources or greater processing capabilities. Additionally, or alternatively, an end device may refer to a communication device that solicits or requests a processing task, while an edge node may refer to a communication device that executes a processing task. Devices such as access points (APs), user equipments (UEs), mobile stations (STAs), routers, mobile devices (smartphones), cars, laptops, gaming consoles, extended reality (XR) glasses or headsets, augmented reality (AR) devices, virtual reality (VR) headsets, thermostats, sensors, IoT devices, and other consumer devices may serve as edge nodes, end devices, or both at different times.

In some implementations, a processing task may be associated with an input and a result (such as an output). The input of a processing task may refer to data provided by an end device, while the result of a processing task may refer to output data provided by an edge node. The result of a processing task may, in some implementations, be computed, synthesized, generated, derived, or otherwise obtained from data provided by an end device. As the terms "end device" and "edge node" are relative and defined, at least in part, on the basis of device capability or task execution, a communication device may function as an end device for some processing tasks (by soliciting or advertising a processing task to other communication devices), and may function as an edge node for other processing tasks (by executing processing tasks requested by other communication devices).

A cloud edge may refer to a communication device that provides a connection between the edge layer of an edge computing system (which may include end devices and edge nodes) and the cloud layer of an edge computing system (which may include cloud servers and network edges). As described herein, a cloud node may refer to a data center, server, or compute system that is remote (such as physically separated) from the edge layer of an edge computing system. A cloud node may have relatively greater processing capabilities compared to edge nodes and end devices. In some systems, using cloud nodes for task execution and workload distribution may introduce delays, privacy concerns, and backhaul issues, which may be undesirable for some use cases. Additionally, some edge computing systems may be unable to account for device mobility or channel variability, which may decrease the resiliency of such systems. For example, in some deployments, communication devices may be mobile (such the devices may change location within the system) or transient (such that the devices may enter or exit the system) and may experience variable channel conditions, and some edge computing systems may lack task distribution techniques that account for system variability (such as the location or battery life of a mobile computing node).

In some implementations, an end device may provide one or more edge nodes of an edge computing system with network link information (such as channel quality measurements, motion data, or link topology information), which may enable the edge nodes to schedule and distribute task workloads within the edge computing system more effectively. For example, if the end device transmits a processing task request to a first edge node (such as a master edge node), the first edge node may assign or distribute the processing task to a second edge node according to the network link information provided by the end device. Additionally, or alternatively, the end device may assign a processing task to an edge node according to an availability or an estimated task completion time provided by the edge node. For example, the end device may transmit an indication of processing task parameters (such as payload size, quality of service (QoS) criteria, job type, etc.) to each edge node in the edge computing system and may receive an indication of an estimated completion time of the processing task from each of the edge nodes. Accordingly, the end device may assign the processing task to an edge node with the most favorable conditions, such as the lowest estimated completion time or the highest connection reliability (if the edge node is doing real-time processing for the end device). The end device also may consider factors such as bandwidth, latency, user policy constraints, and compute resource costs when assigning the processing task to an edge node. Additionally, or alternatively, the end device may analyze communication links and device capabilities (such as video/audio encoding capabilities or battery power for a mobile computing device) when selecting an edge node to execute the processing task.

Particular implementations of the subject matter described in this disclosure can be implemented to realize one or more of the following potential advantages. For example, the dynamic edge resource management techniques described in this disclosure may improve the overall performance of edge computing systems by enabling devices (such as end devices and edge nodes) to orchestrate and execute processing tasks with greater efficiency. For example, a master edge node may dynamically schedule and update workload assignments amongst other edge nodes according to network link information provided by an end device. Thus, aspects of the present disclosure may enable edge nodes to efficiently account for topology changes, channel variability, device mobility, and other factors when distributing and (re)assigning processing tasks within an edge computing environment. Moreover, the distributed resource management schemes described herein may be resilient to internet outages, connectivity issues, and other network failures. Thus, in comparison to other systems that depend on cloud services for task orchestration, the edge computing systems described herein may offer greater consistency and improved performance, which may facilitate richer and more seamless user experiences, among other benefits.

Furthermore, some security, privacy and data sovereign regulations may provide incentives for using aspects of the distributed network architecture described herein. The edge-based workload orchestration techniques described herein also may enable networks to function without a cloud connection (which can be unreliable or unavailable at times). For example, a shipping container system, which may experience limited cloud connectivity at various points in a route, can use the edge-centric task distribution schemes disclosed herein to effectively manage device workloads. Additionally, the described techniques may reduce backhaul costs by promoting localized, edge-based data processing. Furthermore, using idle edge compute resources to augment cloud-based computing systems may be desirable as more compute capabilities are deployed to the edge. For example, a parking garage with charging autonomous electric vehicles can function as an edge-based computing system for nearby devices. Thus, aspects of the present disclosure may promote higher network availability (such as greater network resiliency), lower latency, greater security, and higher throughput by shifting workload distribution from the cloud to the edge.

FIG. 1 shows an example wireless communications system 100 that supports intelligent cloud-edge resource management. The wireless communications system 100 may include one or more network entities 105, at least one UE 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as an RF access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are shown in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an AP, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof.

An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor.

An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support intelligent cloud-edge resource management as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation.

A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140 or an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (such as via Machine-to-Machine (M2M) communication). M2M communication or MTC may refer to data communication technologies that allow devices to communicate with one another or a network entity 105 (such as a BS 140) without human intervention. In some implementations, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as a mode that supports one-way communication via transmission or reception, but not transmission and reception concurrently). In some implementations, half-duplex communications may be performed at a reduced peak rate. Other power conservation techniques for the UEs 115 include entering a power saving deep sleep mode when not engaging in active communications, operating using a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (such as UEs 115). In some implementations, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some implementations, vehicles in a V2X system may communicate with roadside infrastructure, such as roadside units, or with the network via one or more network nodes (such as network entities 105, BSs 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may utilize a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The wireless communications system 100 may be an example of an edge computing system that includes a variety of devices, such as APs, routers, mobile devices (smartphones), cars, laptops, and gaming consoles, security cameras, XR glasses, AR devices, smart thermostats, IoT devices, and other consumer devices connected to the network. These devices may serve as edge nodes, end devices, or both at different times. In comparison to edge nodes, end devices may have fewer computing resources and relatively limited processing capabilities. Thus, in some scenarios, an end device may rely on an edge node to process, analyze, and execute relatively larger computing workloads (such as processing tasks) that would otherwise result in delays and power consumption at the end device. Some end devices, such as security cameras, may process workloads locally instead of offloading such workloads to other devices. This may reduce the likelihood of mission critical devices experiencing denial of service (DoS) attacks.

In other scenarios, an edge node may send a request for a processing task to an end device. For example, if a security camera detects that an individual is near the front door, but the face of the individual is outside the field of view, an edge node may request that other nearby security cameras (to the right and left of the security camera) zoom in and begin recording video footage. Once the edge node receives the video footage from the other security cameras, the edge node may process the video footage using available compute resources. In some implementations, a processing task (also referred to as a device workload) may be associated with an output, which can include data, commands (such as to increase the temperature of a thermostat), alerts (such as a police alert), notifications (such as to a homeowner), or exporting data to the cloud for analysis or logging (such as video footage from a suspected break-in).

In some edge computing systems, such as a Wi-Fi self-organizing network (SON), the collective workload of the edge computing system may be distributed across the various edge nodes in the edge computing system (such as UEs 115 and network entities 105). Some edge computing systems may support compute resource management schemes for data centers, stationary compute nodes, and other devices. Such schemes may depend on communication links between devices having sufficient robustness and quality. However, these schemes may be unsuitable for mobile computing environments in which devices (such as cars, laptops, personal devices, and other compute nodes) move into the network, out of the network, or within the network at different times.

For example, in some mobile edge compute (MEC) deployments associated with cellular networks, an end device (such as a UE 115) may move between different network entities 105, resulting in changes to MEC latency criteria. As such, the topology of wireless communication links between edge nodes and end devices may vary over time. Current edge computing deployments may be unable to account for device mobility when scheduling and distributing device workloads. For example, some transitory edge nodes (such as vehicles and automobiles, or mobile devices) may be unavailable during specific time periods and other edge nodes may be unable to adjust or redistribute task workloads according to the availability of transitory edge nodes. As described herein, a transitory edge node may be an edge node with periodic or intermittent availability, such that the transitory edge node is temporarily available and otherwise unavailable for task processing or execution.

In some edge computing deployments, device workload distribution may be orchestrated (such as managed) by a cloud server or a data center. However, relying on cloud devices (such as the cloud edge 215 illustrated by and described with reference to FIG. 2) for workload management and task execution may introduce delays, privacy concerns, and backhaul issues. For example, due to an inverse relationship between locality (such as distance) and latency (such as processing time) that exists in distributed computing environments, executing a processing workload at a nearby edge node may be more effective (with respect to latency) than offloading the processing task to a remote cloud server. Thus, although the cloud server may have relatively greater processing capabilities (in comparison to other edge nodes and end devices), relying on the cloud to execute workloads may introduce unacceptable delays and security issues. Moreover, cloud devices may be several hops away from edge nodes within the edge computing system, and may experience connectivity issues.

Aspects of the present disclosure support dynamic edge-level orchestration techniques for end device workload distribution within an edge computing system. In accordance with the techniques described herein, a first (master) edge node may receive network link information from one or more end devices, and may use the network link information (in combination with workload information provided by peer edge nodes) to assign workloads to one or more edge nodes in the edge computing system. The network link information described herein may include QoS metrics, payload size information, link topology information, motion data, or other pertinent information. End devices may periodically provide network link information to one or more edge nodes within the edge computing system.

In some implementations, rather than orchestrating workload distribution from a single (master) edge node, end devices may select or assign workloads to suitable edge nodes according to factors such as an estimated completion time, a communication link quality, or the like. For example, an end device may transmit a workload request to different edge nodes in the edge computing system, receive an estimated workload completion time from each of the edge nodes (according to the availability of compute resources at those edge nodes), and assign the workload to the edge node with the lowest estimated completion time.

To account for the variability of communication links in the edge computing system (due to mobility and interference), the end devices and edge nodes may update the topology of these communication links. For example, an end device may periodically or aperiodically transmit updated network link information to one or more edge nodes (including the master edge node) and at least one of the one or more edge nodes (such as the master edge node) may use the updated network link information for workload distribution orchestration. Resource management schemes that account for computing and communication link topology, device service payload, and device priority may offer improved performance by enabling end devices to filter edge nodes according to the quality and availability of communication links.

Figure 2:
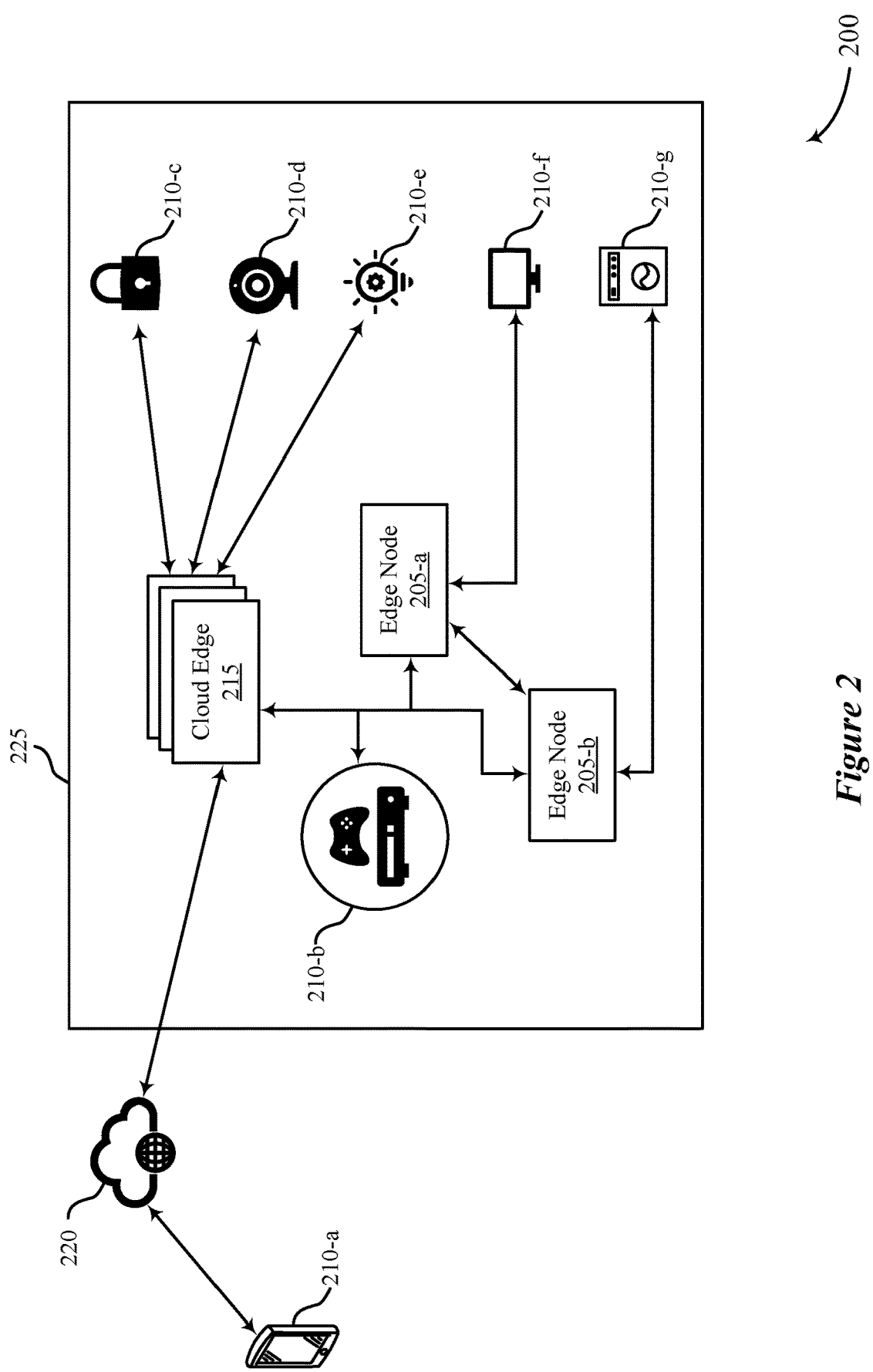
FIG. 2 shows a diagram of an example system that supports intelligent cloud-edge resource management.

FIG. 2 shows a diagram of an example system 200 that supports intelligent cloud-edge resource management. The system 200 may implement aspects or be implemented by aspects of the wireless communications system 100. For example, the system 200 includes end devices 210, each of which may be an example of one or more aspects of a UE 115 or a network entity 105 as described herein, including with reference to FIG. 1. Additionally, the system 200 includes edge nodes 205, each of which may be an example of one or more aspects of a UE 115 or a network entity 105 as described herein, including with reference to FIG. 1. In the system 200, the edge nodes 205 may distribute and execute workloads or processing tasks received from the end devices 210 according to a dynamic edge-level orchestration scheme. The system 200 shows various applications running concurrently, where each application may have different QoS parameters and relative priorities. The system 200 may support improved network reliability and enhanced network management capabilities, such as high availability according to which the network may function in various scenarios, including a scenario of no internet connectivity.

Some wireless communications systems, such as an edge computing system 225 shown in the example of FIG. 2, may include a cloud edge 215 (such as an AP or network edge with an artificial intelligence (AI) or machine learning (ML) agent), one or more edge nodes 205 (which also may be referred to as device edges, compute nodes, edge compute devices, or network edge devices), and one or more end devices 210. The end devices 210 may include an end device 210-a (such as a UE 115 described with reference to FIG. 1), an end device 210-b, an end device 210-c, an end device 210-d, an end device 210-e, an end device 210-f, and an end device 210-g. The end device 210-a may be an example of a user device with an application for policy control, monitoring, and management. The end device 210-b may be an example of a Wi-Fi compliant gaming console. The end device 210-c may be an example of a Zigbee compliant smart lock. The end device 210-d may be an example of a Wi-Fi compliant smart camera. The end device 210-e may be an example of a Wi-Fi compliant smart electric device. The end device 210-f may be an example of a Wi-Fi smart television (TV). The end device 210-g may be an example of a Wi-Fi compliant smart washer. The end devices 210 may, in some implementations, utilize IoT protocols such as Message Queuing Telemetry Transport (MQTT), Matter, ioFog, or other protocols.

The cloud edge 215 may support edge-to-edge communications across network nodes (such as Kubernetes clusters) using a service interconnect (such as Skupper). The cloud edge 215 may include a local compute component, a local storage component, a data management component, a device management component, a preferences component, and a rules component. The cloud edge 215 may support zero-touch provisioning for the end device 210-c using an IoT protocol (such as MQTT). The cloud edge 215 also may support zero-touch provisioning for the end device 210-e using an IoT protocol (such as Matter). The end device 210-a may, in some implementations, communicate with the cloud edge 215 via a cloud service 220, which may be hosted by one or more servers, data centers, or compute devices that are physically or logically separated from the edge computing system 225. The cloud service 220 may provide internet access to compute devices in the edge computing system 225 (such as the end devices 210 and the edge nodes 205). The cloud service 220 may include an internet cloud component, a play store cloud component, a development operations cloud component, a cloud compute component, a cloud storage component, or some combination thereof.

In some implementations, the end device 210-b may be associated with relatively high QoS criteria. The cloud edge 215 (equivalently referred to as a network edge) may handle AI and ML-based traffic classifications for the edge node 205-a. The edge node 205-a may be configured with one or more programs, files, or applications (such as an Android Package Kit (APK)) that support dynamic edge task orchestration. The edge node 205-a may include one or more of a local compute component, a local storage component, a data management subset component, and a device management component. Similarly, the edge node 205-b may include one or more of a local compute component, a local storage component, a data management subset component, and a device management component. The edge computing system 225 may support device edge mobility. For example, the edge node 205-a may initiate a handover procedure to the edge node 205-b when moving outside of the edge computing system 225. The edge node 205-a may support zero-touch provisioning for the end device 210-f using an IoT protocol (such as ioFog). In some implementations, the end device 210-f may have a relatively high QoS criteria. The edge node 205-b may support zero-touch provisioning for the end device 210-g using an IoT protocol (such as ioFog).

One or more aspects of the edge computing system 225 may be implemented using a software architecture that includes an application framework, middleware (core services), a platform, and one or more hardware accelerators. The application framework may be implemented using various application support functions, a Representational State Transfer (REST) architecture, Hypertext Transfer Protocol (HTTP), Web Real-Time Communication (WebRTC), or any combination thereof. The middleware may include data ingestion and processing services (including AI or ML), systems for monitoring, alerting, and event trigger management, storage, rules, user profiles and preferences, device provisioning and profile discovery, secure edge-to-edge communications, and other functionality. The platform may include an operating system (OS) with role-based access control (RBAC) and other components.

One or more of the end devices 210 may have latency criteria, bandwidth criteria, processing resource criteria, and other weight-related criteria. Reducing the onboard resources and battery size of the end devices 210 (both of which may contribute to the weight of the end devices 210) may improve the overall performance and usability of the end devices 210. The techniques described herein may enable users of the edge computing system 225 to protect their personal privacy, including, but not limited to, security camera footage and other behavioral habits reflected by the end devices 210. In some implementations, the edge computing system 225 may be configured to function without an Internet connection. For example, the cloud edge 215 and the edge nodes 205 may be capable of orchestrating and executing processing tasks from the end devices 210 without assistance from the cloud service 220.

As described herein, one or more of the end devices 210 may discover and use computing resources with the most favorable network characteristics. In some implementations, one or more of the end devices 210 may discover compute resources of the edge nodes 205, advertise workloads to the edge nodes 205, and receive workload completion estimates (bids) from one or more of the edge nodes 205. In some other implementations, one or more of the end devices 210 may send a workload request to a central resource manager (such as the edge node 205-a). Accordingly, the central resource manager may distribute the workload request according to node resource availability, workload priority, historic data, QoS criteria, and other criteria. As such, devices of the edge computing system 225 may discover and use the "best" available computing resources on the local network at any given time depending on a node connectivity, task size and response constraint, computing availability, and quality of one or more communication links.

For device-driven task assignment schemes, the end devices 210 may perform a discovery procedure to detect, receive an indication of, or otherwise select a central resource manager. In some implementations, for example, the end device 210-*f* may select the edge node 205-*a* as a central resource manager according to a processing capability of the edge node 205-*a*, a quality of a wireless communication link between the edge node 205-*a* and the end device 210-*f*, or other factors. In some implementations, the central resource manager selection process may depend on a current or predicted location of the end devices 210. For example, the end device 210-*a* may select the edge node 205-*b* as a central resource manager when the end device 210-*a* is within the edge computing system 225, and may select a different node (such as the cloud service 220) as a central resource manager if the end device 210-*a* is outside the edge computing system 225. In other words, the end device 210-*a* may select the edge node 205-*b* in accordance with a proximity (or a predicted proximity) between the end device 210-*a* and the edge node 205-*a*. In some implementations, the central resource manager selection process may vary according to whether the end devices 210 successfully discover a central resource manager during an initial discovery process. For example, at home, an end device 210 may select a central resource manager. While away from the home, an end device 210 may select a resource manager located in a car or a smartphone. As such, an end device 210 may ascertain, identify, or otherwise figure out if there is a central resource manager on the network or not and may advertise workloads accordingly.

The edge computing system 225 may support a wide array of applications, including, but not limited to, intelligent network management with application to mesh networks, assignment of end devices 210 to APs (such as the cloud edge 215) according to radio conditions and load balancing criteria, deployment and integration of data from one or multiple video cameras for home security or health-related applications, support of split-rendering for head mounted displays (such as for XR devices), home energy management systems, as well as management and use of smart home devices. Further, the edge computing system 225 may provide alternative routing to the Internet in scenarios in which there is an ISP failure.

The processing tasks described herein (also referred to as task workloads or data services) may be associated with different workload types. Examples of workload types include aperiodic jobs (in which resources are asynchronously requested) and periodic jobs (in which resources are requested at regular intervals). Both types of workloads (aperiodic and periodic) can be real-time or non-real-time, depending on whether they are latency-sensitive or latency-tolerant. Likewise, both workload types can be bounded or unbounded. A bounded job is one with a deterministic and finite processing workload. More specifically, the input data for a bounded job may be finite (such as a 15 second video sequence from a security camera) and the output path(s) of a bounded job may be deterministic. In a publish-subscribe model, there may be multiple subscribers to a processing outcome (such as a notification that an object other than a tree or a shadow was detected in a video sequence). These subscribers (such as a service that detects humans or distinguishes wildlife from domestic animals) may be determined ahead of time for bounded jobs. Some bounded jobs may be real-time critical jobs, while other bounded jobs may be latency-tolerant. Some bounded jobs may be executed as a batch job, where the job workload is submitted (requested) and the processed results are made available at a later time (such as on a first come, first serve basis). In contrast, unbounded jobs may have continuous or recurring workloads, such as real-time processing of video footage from a security camera.

Examples of bounded jobs may include rendering an image according to a graphic engine specification, performing voice recognition on an audio segment, or providing a semantic interpretation of an image. As an example, a bounded workload may include a request to identify an object (such as a cat) within an image or a request to identify all faces within an image database. Periodic jobs may include, for example, transcoding a video stream, where packets arrive at set intervals (such as every few milliseconds). Critical real-time jobs may include, for example, responding to an outpatient or continuous monitoring event. Non-real-time jobs may have less stringent latency thresholds. As such, data can be stored and processed accordingly. Examples of non-real-time jobs include initiating a corrective action when a temperature reading measured by a thermostat exceeds a threshold, or performing facial recognition on stored images. Different workload types may have different communication criteria and targets, such as delivering a task result with a target latency or outputting a data stream of encoded packets with a target throughput and latency.

Some workloads may have multi-dimensional task performance specifications (denoted as $C_i$, $T_i$, and $D_i$). For example, a task workload may have a computing constraint of maintaining a processing latency percentage less than a threshold ($C_i$), a communication constraint of maintaining a throughput greater than a threshold ($T_i$) and a latency percentage lower than a threshold ($D_i$). A workload may have multiple specifications (i=1, 2, . . . N) that correspond to a desired level of quality or performance for the workload. For example, frames of an XR or video stream may be processed or rendered with different resolutions.

The end devices 210 may, in some implementations, be capable of detecting, ascertaining, receiving an indication of, or otherwise determining whether a central resource manager is present in the edge computing system 225, and may advertise workloads accordingly. In computing environments that support distributed edge computing mechanisms, an end device 210 (such as a set of XR glasses) may send workload requests to a master edge node (such as the cloud edge 215 or the edge nodes 205). In some implementations, a central resource manager for an end device 210 may be temporarily inaccessible due to mobility of the central resource manager or the end device 210. If the end device 210 is transitory (such as mobile, experiencing unfavorable network conditions, or both), the end device 210 may, in some implementations, determine that one of the edge nodes 205 is unavailable, and may send workloads to a different edge node 205. In a home supporting an edge compute system including one or more master edge nodes (such as a distributed edge computing system), for example, XR glasses may send workloads to a master node. In transitory scenarios, such as while a user is walking about, the XR glasses may ascertain, identify, or otherwise figure out that only a smartphone is present, and may send workloads to the smartphone. The smartphone may have compute capabilities to host applications and process workloads received from the XR glasses. Further, a central resource manager may disappear or lose internet connectivity (such as during device edge mobility or internet service provider (ISP) failures), and devices of the edge computing system 225 may account for such possibilities during workload scheduling or distribution.

For distributed systems, devices may consider workload resource criteria (such as graphics or physics engine criteria or neural processor criteria), power availability, and AI or ML-based resource availability predictions. Resource prediction also may use historic data or trend information associated with user behavior and network performance. The techniques described herein also may support management of adaptive content with user experience (such as scheduler hysteresis). For example, the edge nodes 205 may render or composite fewer objects when a network QoS is unsatisfactory or when there are insufficient compute resources available for a processing task.

For centralized deployments, a master device edge (such as the edge node 205-a) may generate and maintain a map of which compute resources are available on different edge nodes 205. A downloadable application on an end device 210 (such as a laptop) may discover local compute resources and automatically complete the device service. The master device edge also may maintain a centralized priority of tasks according to user-specified policies. For example, applications running on a laptop associated with a first user may have a higher priority than applications and services running on a device associated with a second user. The master device edge may query other edge nodes 205 for a real-time status update of resource availability before assigning workloads to other edge nodes 205.

The master device edge (such as the edge node 205-a) also may maintain coherency of scheduling information and trend data with other compute resources (such as the cloud edge 215 and the edge node 205-b), which may enable other edges nodes 205 to perform task orchestration if the master device edge goes offline. For example, the master device edge may generate a coherency map associated with link topology, latency, bandwidth, or other factors. In some implementations, execution of lower priority tasks may be pre-empted for higher priority tasks. The master device edge also may consider device location, device mobility, and link topology when distributing workloads amongst other compute resources in the edge computing system 225. Periodic or aperiodic topology updates may indicate a point of attachment and a mobility of end devices 210 within the edge computing system 225. In some implementations, the master device edge may consider predictive mobility (such as an expected location of an end device 210) when assigning or distributing workloads amongst compute resources in the edge computing system 225.

Figure 3:
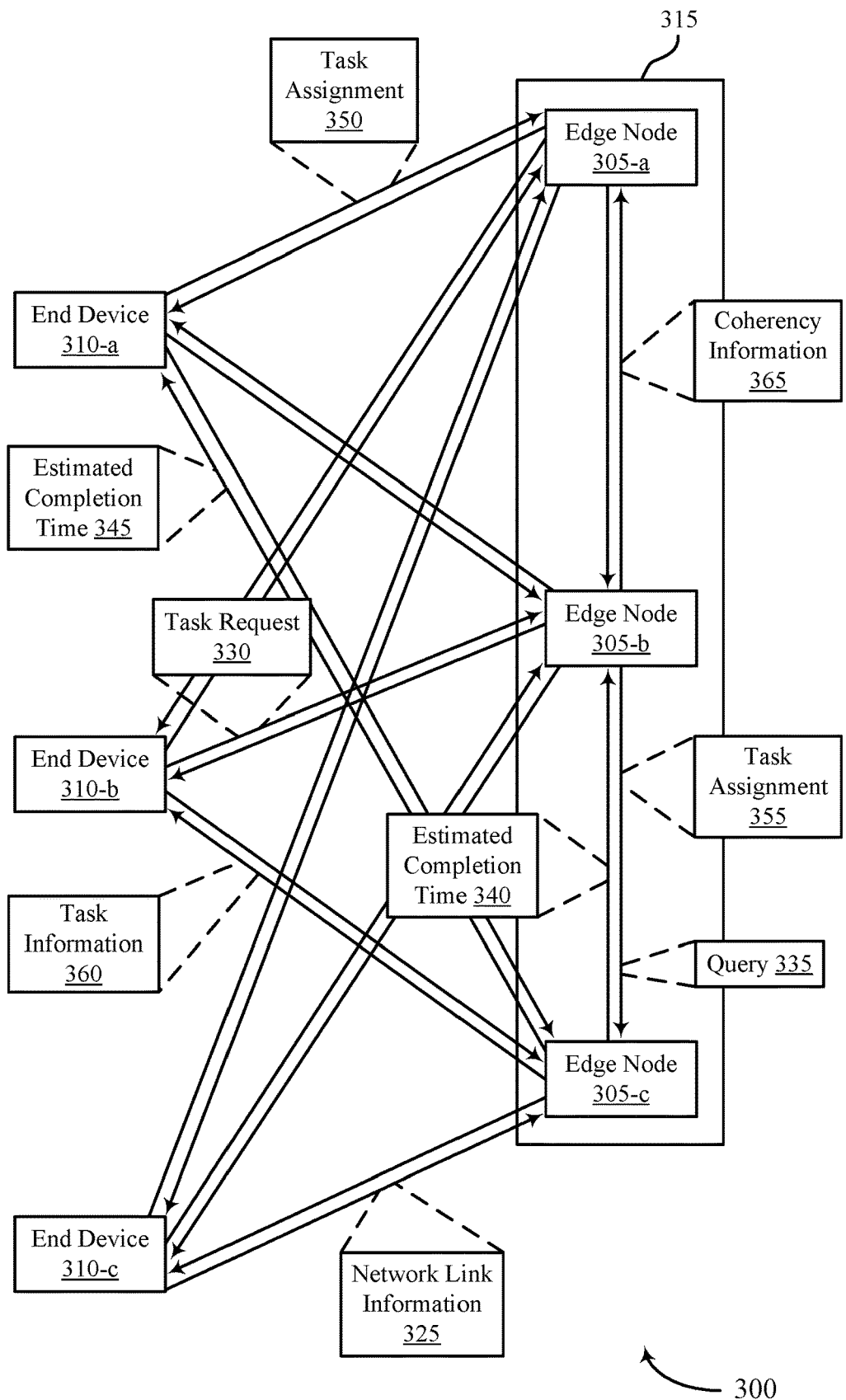
FIG. 3 shows a diagram of an example network that supports intelligent cloud-edge resource management.

FIG. 3 shows a diagram of an example network 300 that supports intelligent cloud-edge resource management. The network 300 may implement aspects or be implemented by aspects of the wireless communications system 100 or the system 200. For example, the network 300 includes end devices 310, each of which may be examples of one or more aspects of an end device 210 as described herein, including with reference to FIG. 2. The network 300 also may include edge nodes 305, each of which may be an example of one or more aspects of an edge node 205 as described herein, including with reference to FIG. 2. One or more of the edge nodes 305 may be partitioned (logically, physically, or by other means) into an edge cluster 315. In the network 300, the edge nodes 305 may receive and process workloads from the end devices 310 in accordance with a dynamic edge-based task distribution scheme.

As described herein, processing tasks from end devices 310 (such as an end device 310-c) may be distributed and assigned to edge nodes 305 in accordance with a centralized task distribution scheme or an opportunistic device-driven task distribution scheme. In a centralized task distribution scheme, an edge node 305-b (a first edge node, such as an AP) may assign a processing task received from an end device 310-b (such as a pair of XR glasses) to an edge node 305-c (a second edge node, such as a personal computer). In other words, the end device 310-b may transmit a request 330 for the processing task to the edge node 305-b and the edge node 305-b may assign the processing task to the edge node 305-c in accordance with information conveyed or indicated by the request 330.

For example, the request 330 may indicate one or more processing characteristics (such as latency per transaction, frames per second rendered, resolution, rendering engine criteria) associated with the processing task. Accordingly, the edge node 305-b may assign the processing task to the edge node 305-c according to a current resource availability of the edge node 305-c, or by querying one or both of the edge node 305-a or the edge node 305-c. For example, the edge node 305-b may transmit a query 335 to the edge node 305-c and may transmit a task assignment 355 to the edge node 305-c according to an estimated completion time 340 provided by the edge node 305-c. In other words, in implementations in which the edge node 305-b queries (such as transmits a message requesting information associated with a processing availability of) the edge node 305-a and the edge node 305-c, the edge node 305-a and the edge node 305-c may transmit respective indications of estimated completion times to the edge node 305-b and the edge node 305-b may select the edge node 305-c in accordance with the estimated completion time 340 provided by the edge node 305-c being less than an estimated completion time provided by the edge node 305-a.

In some implementations, the edge node 305-b may instruct the edge node 305-c to allocate resources for the processing task according to processing characteristics of the processing task. The edge node 305-c may allocate the requested resources and transmit a confirmation or acknowledgement to the edge node 305-b. In turn, the edge node 305-b (also referred to as an orchestrator or a resource manager) may relay an identifier of the edge node 305-c (also referred to as a computational entity or an edge compute resource) to the end device 310-b such that the end device 310-b can use the edge node 305-c for distributed processing. For example, the end device 310-b may send a task input (such as vector-based data) to the edge node 305-c and the edge node 305-c may return task information 360 (such as a rendered bitmap) to the end device 310-b. In some implementations, the end device 310-b (an application that supports distributed processing for expedited workload execution) may request up to a threshold quantity of computing resources and may be granted fewer than the requested quantity of computing resources (such as one computing resource).

As described herein, computing resources (also referred to as compute resources or processing resources) are measurable quantities of compute power that can be requested, allocated, and consumed for computing activities. Some examples of compute resources include central processing unit (CPU) resources, graphics processing unit (GPU) resources, neural processing unit (NPU) resources, random access memory (RAM), read-only memory (ROM), input/output (I/O) resources, and network addressable storage (NAS) resources. Some compute resources (such as CPU, GPU, and NPU) may be measured in units of cores or millicores. Other compute resources, such as RAM and ROM, may be measured in bytes, kilobytes (kB), megabytes (MB), or gigabytes (GB), among other examples. Applications running on a single physical device may be confined to using compute resources of that device. However, distributed applications (such as programs that are executed across multiple devices) may simultaneously access processing resources from different physical devices.

A compute resource may be associated with a specific device and device type. Further, in some implementations, devices may host multiple instances of compute resources. For example, a server blade in an autonomous vehicle may have software that orchestrates workloads across different compute engines (such as NPUs, GPUs, or CPUs). As disclosed herein, allocating compute resources may refer to the ability of a device (such as an end device or an edge node) to address and use a single compute resource (such as a CPU core or a kB of RAM) on a per-device basis. This does not preclude devices from using other resources that are deployed at the edge, provided that such resources are uniquely accessible. In other words, the edge-based system architecture disclosed herein may leverage cloud-based computing schemes and resources when feasible. For example, the resource management schemes described herein may leverage local edge-node extensions of cloud-based platforms with distributed architectures. Compute resources may be multi-dimensional, and may be used for a variety of operations (such as processing or transcoding). Thus, requested compute resources can be a composite of various types of resources, each of which can be measured in units of cores, bytes, hertz, or other suitable metrics. Generally, the units of the requested compute resources may be a function of the actual resources, and may vary according to workload type. The compute resources requested or allocated for a processing workload may be distributed across multiple edge nodes 305 or end devices 310.

In some implementations, such as for Infrastructure-as-a-Service (IaaS) models, compute resources may quantified using metrics other than cores, bytes, and hertz. For example, a compute resource may advertise how long the compute resource will take to decrypt a given payload using a specific decryption protocol, or how long the compute resource will take to decompress a given video resolution using a specific decompression standard. The compute resource may also indicate, for example, that the compute resource can decrypt up to 1 k high-definition (HD) video (but nothing higher). In some implementations, the compute resource may also publish security and virtualization aspects supported by the compute resource. For example, a laptop may not support virtualization or containerization, but the laptop may have memory access controls to ensure that no other service(s) running on the laptop (such as debugging programs) can access the memory space allocated for an offloaded task. While the compute resource may schedule processing tasks according to estimated completion time, the compute resource may, in some implementations, transmit (to a predictive scheduler) an indication of an actual completion time for the processing task, and may update subsequent task completion estimates accordingly.

In the example of FIG. 3, each of the edge nodes 305 may estimate the quality of communication links between the edge nodes 305 and the end devices 310 using device profile information associated with the edge nodes 305 and respective connection QoS parameters (such as latency, effective bandwidth, or beam directivity). The edge nodes 305 may factor in self-contention (for transmission and reception) if the communication links include multiple hops. The edge nodes 305 and the end devices 310 may exchange network link information 325 that indicates the estimated quality of the communication links, along with other pertinent information. For example, the network link information 325 may include a signal to interference and noise ratio (SINR), a channel quality indicator (CQI), channel state information (CSI), a reference signal received power (RSRP), or a received signal strength indicator (RSSI), among other metrics.

Accordingly, each of the edge nodes 305 may receive, analyze, or otherwise determine a compute task from a respective service or application (such as 30 Hz, HD image object detection) and return an estimate of how long the task will take to complete in accordance with a specified set of parameters (such as payload size, quality, or performance). In some implementations, the payload size of a processing task may be different from the payload size associated with a result of the processing task (such as the task information 360). In some implementations, processing tasks may be assigned or distributed independent of processing task request size. Processing tasks may, in some implementations, be assigned according to a battery level of an edge node 305 or whether an edge node 305 is connected to a power source.

A payload (also referred to as a task workload) may be bounded for a non-interruptible duration (such as a collection of video frames between I-frames). An AI-based predictive resource manager may improve the accuracy of resource scheduling by supporting relatively long interval trends (which may improve QoS as well as user or device task predictions). Some device applications may have a license to a specific compute application programming interface (API) that is inaccessible to other applications. The resulting GPU access provided by this API may be factored into an estimated completion time 340 calculated by the edge node 305-c.

Some edge nodes 305 may store data for non-real-time devices to be processed at a later time. A master edge node (such as the edge node 305-b) can assign a compute task assignment to a serving node (such as the edge node 305-a) according to various criteria, including, but not limited to, communication link quality metrics indicated by the network link information 325 (eliminating communication links with unsatisfactory link conditions), user-specified task priorities, whether tasks use historical data access for applications that analyze trends, whether other edge nodes 305 have updated coherency information (such as historical or most recent data), or other similar factors.

In some implementations, a master device edge (such as the edge node 305-b) may update a master schedule and send the updated master schedule to other device edges (such as the edge node 305-a and the edge node 305-c) when new processing tasks are started or completed. The master device edge also may consider the relative mobility of the end devices 310 (such as the predictive movement path of an end device 310-a) when distributing workloads amongst the edge nodes 305. In some implementations, a serving node for an end device 310 may provide other edge nodes 305 with coherency information 365 (such as relevant trend data or updated models) to maintain coherency for subsequent task scheduling operations, which may facilitate future scheduling flexibility. Application payloads may be scheduled across the edge nodes 305 (as opposed to individual threads). Thread-level scheduling (if supported) may be performed within individual processing units of an edge node 305.

In some implementations, the end device 310-a may indicate a preference to manually schedule device payload tasks. To support this functionality, each of the edge nodes 305 that receives a device payload task request from the end device 310-a may estimate an approximate payload completion time using device profile information and respective connection QoS parameters (such as latency and effective bandwidth). Accordingly, each of the edge nodes 305 may identify, select, ascertain or determine a compute task from a respective service or application (such as 30 Hz, HD image object detection) and return an estimated completion time 345 for the task under the specified conditions (such as payload, quality, or performance). To support this functionality, a payload may be bounded for a non-interruptible duration (such as a collection of video frames between I-frames).

Accordingly, the end device 310-a may select an edge node (such as the edge node 305-a) to handle the task by transmitting a task assignment 350 to the selected edge node. In some implementations, the compute device selected by the end device 310-a may refrain from updating a master schedule with the task assignment, thereby preventing a master device edge (such as the edge node 305-b) from reassigning the processing task to another compute device. For subsequent service requests, the serving node may factor in the manual task assignment from the end device 310-a when computing workload completion estimates. The serving node also may provide other edge nodes 305 with relevant trend data and updated data models to maintain coherency for subsequent scheduling operations. If the end device 310-a is mobile, the serving node (such as the edge node 305-a) may provide other edge nodes 305 with link topology information (such as updated link topology information) and coherency data.

Figure 4A:
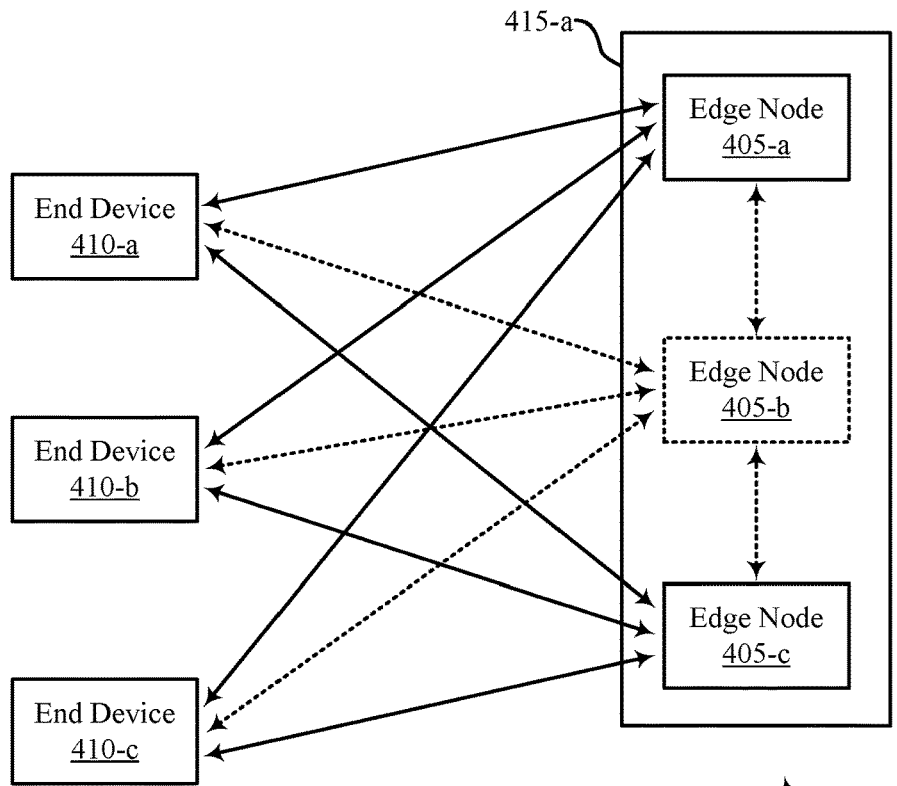
FIGS. 4A and 4B show diagrams of example networks that support intelligent cloud-edge resource management.
Figure 4B:
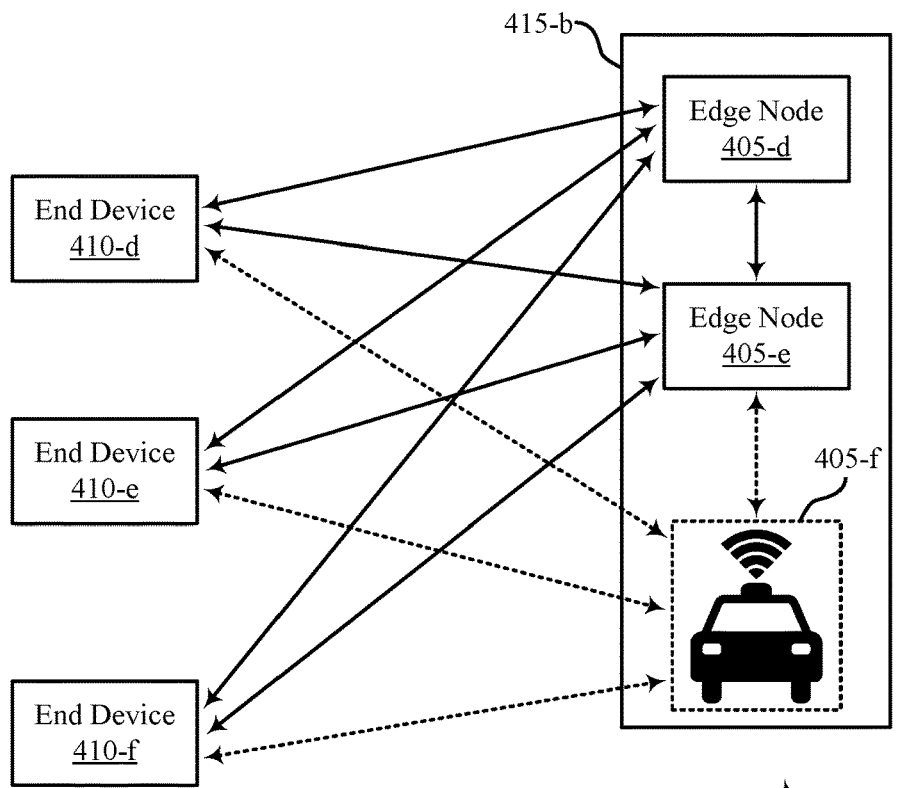

FIGS. 4A and 4B show a diagram of an example network 400 and a diagram of an example network 401, respectively, that support intelligent cloud-edge resource management. The network 400 and the network 401 may implement aspects or be implemented by aspects of the wireless communications system 100, the system 200, or the network 300. For example, the network 400 and the network 401 include end devices 410, each of which may be an example of one or more aspects of an end device 310 as described herein, including with reference to FIG. 3. The network 400 and the network 401 also include edge nodes 405, each of which may be an example of one or more aspects of an edge node 305 as described herein, including with reference to FIG. 3. In the network 400, an edge node 405-a and an edge node 405-c may use coherency information provided by an edge node 405-b (a master edge node) if the edge node 405-b goes offline or becomes disconnected from the other edge nodes 405. In the network 401, a transitory edge node (such as the edge node 405-f) may go offline or become disconnected from an edge node 405-d and an edge node 405-c.

As described herein, an edge compute network may include edge nodes 405 with enhanced computing capabilities (such as APs with AI and ML-based traffic classifications) as well as end devices 410 (such as laptops or phones). In comparison to end devices 410, edge nodes 405 may have relatively higher computing capabilities for AI and ML. The techniques described herein support task execution at the end device-level and at the edge node-level. In some implementations, a request or assignment protocol may be used for distribution of processing tasks. However, in some other deployments, processing task coordination may be facilitated by other means, such as a semi-static global network assignment scheme in which workload assignments are periodically updated and conveyed to all edge nodes 405 (such as via a broadcast message). Additionally, or alternatively, workload distribution may be orchestrated locally (without global coordination) by end devices 410 in an opportunistic manner.

Aspects of the present disclosure may enable devices (such as the end devices 410 or the edge nodes 405) to manage topology changes that occur as a result of changes to node count, aggregated processing capacity, connectivity metrics, node battery capacity, workload demand, and other factors. The techniques described herein may be applicable to wired or wireless networks with varying link connectivity dynamics and RF settings. For example, the distributed resource management schemes described herein may be applicable to heterogeneous networks with both wireline and wireless links. The described techniques may support joint resource utilization of aggregate processing resources in a network that has some degree of wireless connectivity between compute devices. In some implementations, processing tasks from end devices 410 may be distributed amongst edge nodes 405 according to trend information, network link information (such as link topology information), coherency information, scheduling information, or other pertinent information. As described herein, link topology may refer to a binary indicator of whether a connection is present between two devices in an edge computing system, may refer to a node count (such as a quantity of connections), or may refer to an overall connectivity scenario between a device and one or more other devices.

To obtain and use dynamic topology information, the end devices 410 and the edge nodes 405 may monitor various link metrics, generate (and transmit or receive) topology information (such as up-to-date topology information, which may be referred to as updated topology information) and utilize the topology information for edge compute resource allocation processes. In some implementations, link topology may factor into the dynamics of joint resource optimization. Link topology information may include, for example, predicted topology changes to wireless communication links between the end devices 410 and the edge nodes 405. For example, an edge node 405-e (a master edge node) may predict that the edge node 405-f (which may be an example of a transitory edge node, such as a vehicle) will become unavailable in the next five minutes in accordance with past user behavior (such as in accordance with a predicted, past, or typical departure time of the vehicle from a home-based system). In some implementations, trend information may be used for device workload execution. For example, an edge node 405-c may determine that a user goes to bed at a specific time, which may enable the edge node 405-c to make more informed scheduling decisions associated with processing availabilities of user devices (such as a cell phone or a laptop, which may have relatively more available processing resources when not being used by the user). In some implementations, the edge node 405-e may use coherency information to assign and distribute tasks amongst compute resources in an edge cluster 415-b. Edge nodes 405 also may use updated AI models and trend information to ensure that processing tasks are executed correctly.

Scheduling information updates may be selectively distributed to edge nodes 405, while updated trend information may be provided to edge nodes 405, end devices 410, and all other compute devices to which task workloads are assigned (such as other cloud edges or device edges in an edge cluster 415-*a*). For example, if data from an end device 410-*d* (a thermostat) is processed by an edge node 405-*d* at a first time and by an edge node 405-*e* at a second time, the edge node 405-*e* may use previous federated model updates from the edge node 405-*d* to accurately process the data from the end device 410-*d* with continuity. In some implementations, if the edge node 405-*f* (which may be an example of a transitory edge node) is disconnected and comes back online, the edge node 405-*e* (which may be an example of a master edge node) may provide the edge node 405-*f* with updated scheduling information as well as device service data that changed since the edge node 405-*f* went offline. The edge node 405-*f* may use this information to maintain data coherency.

In some implementations, an edge node 405-*a* (a first device edge) may query other edge nodes 405 for information related to processing tasks from end devices 410 (such as an end device 410-*a* or an end device 410-*b*). Other edge nodes 405 (such as an edge node 405-*c*) may provide the edge node 405-*a* with an estimate of how long the task will take to complete under the specified conditions (such as latency, bandwidth, or resolution). The edge node 405-*a* may use this information to assign workloads to itself or to one or multiple other edge nodes 405. In some implementations, the edge node 405-*c* may execute a processing task from an end device 410-*c* without reserving a quantity of compute resources for the processing task. Rather, the edge node 405-*b* (a master edge node) may control which workloads are handled by each of the edge nodes 405. Thus, the edge nodes 405 may operate as a distributed processing network. In some implementations, processing tasks orchestrated by the edge nodes 405 may include compute or I/O tasks, such as tasks that involve NAS.

In the example of FIG. 4A, if the edge node 405-*b* goes offline due to device mobility or variable network conditions, the edge node 405-*a* may serve as a new master edge node and manage task scheduling operations until the edge node 405-*b* comes back online, or until a new master edge node with more favorable conditions is identified. A new master edge node may be selected using a scoring algorithm that depends on which remaining edge nodes 405 has the most favorable QoS across the end devices 410 over a period of time. A new master edge node may be assigned in a variety of ways, including, but not limited to, a user-defined order or preference. In some implementations, transitory edge nodes may be unavailable for master edge node assignments. In other words, end devices 410 and edge nodes 405 may support a criteria according to which a transitory edge node may not be selected or assigned as a master edge node. If, for example, no master edge node is assigned, the end devices 410 may use a device-driven assignment scheme for subsequent task distribution (as described with reference to FIG. 6). Other scheduling procedures may continue as scheduled.

In some implementations, if the edge node 405-*b* (the previous master edge node) has unfinished tasks, the new master edge node (such as the edge node 405-*a*) may reschedule the unfinished tasks to remaining edge nodes (such as the edge node 405-*c*). If none of the remaining edge nodes 405 have coherent device data (such as models or historic data), operations may continue as scheduled, although results may vary from previous task processing results. In some implementations, real-time tasks that have exceeded scheduling assignment criteria may be discarded. If the edge node 405-*b* (the original master edge node) comes back online and one or more of the end devices 410 select the edge node 405-*b* as the primary (master) edge node, the edge node 405-*a* may provide updated coherency data to the edge node 405-*b*. Otherwise, a scoring algorithm may be used to select an appropriate master edge node.

In the example of FIG. 4B, if the edge node 405-*f* (a transitory edge node) goes offline, the edge node 405-*e* (a master edge node) may remove the edge node 405-*f* from a master scheduling list. If the edge node 405-*f* has unfinished tasks from one or more of an end device 410-*d*, an end device 410-*e*, or an end device 410-*f*, the edge node 405-*e* may reschedule these tasks to other edge nodes (such as to itself or the edge node 405-*d*). Otherwise (if the edge node 405-*f* has no outstanding or unfinished tasks), the edge node 405-*e* may remove the edge node 405-*f* from the scheduling list without redistributing tasks to other edge nodes 405.

If the edge node 405-*f* comes back online, the edge node 405-*f* may be updated before the edge node 405-*e* adds the edge node 405-*f* back to the master scheduling list. The coherency data of the edge node 405-*f* may be updated for all end devices 410 in the network, such that the edge node 405-*f* can be included for scheduling of subsequent payload tasks from the end devices 410. In some implementations, applications and services of the edge node 405-*f* may be updated, and the security posture of the edge node 405-*f* may be validated to ensure that the edge node 405-*f* is up-to-date. Once the edge node 405-*f* is updated, the edge node 405-*e* may add the edge node 405-*f* back to the master scheduling list. If the edge node 405-*e* has a backlog of task workloads from the end devices 410, the edge node 405-*e* may reassign one or more of the tasks to the edge node 405-*f*. Additionally, or alternatively, the edge node 405-*e* may assign new task workloads to the edge node 405-*f*.

Figure 5:
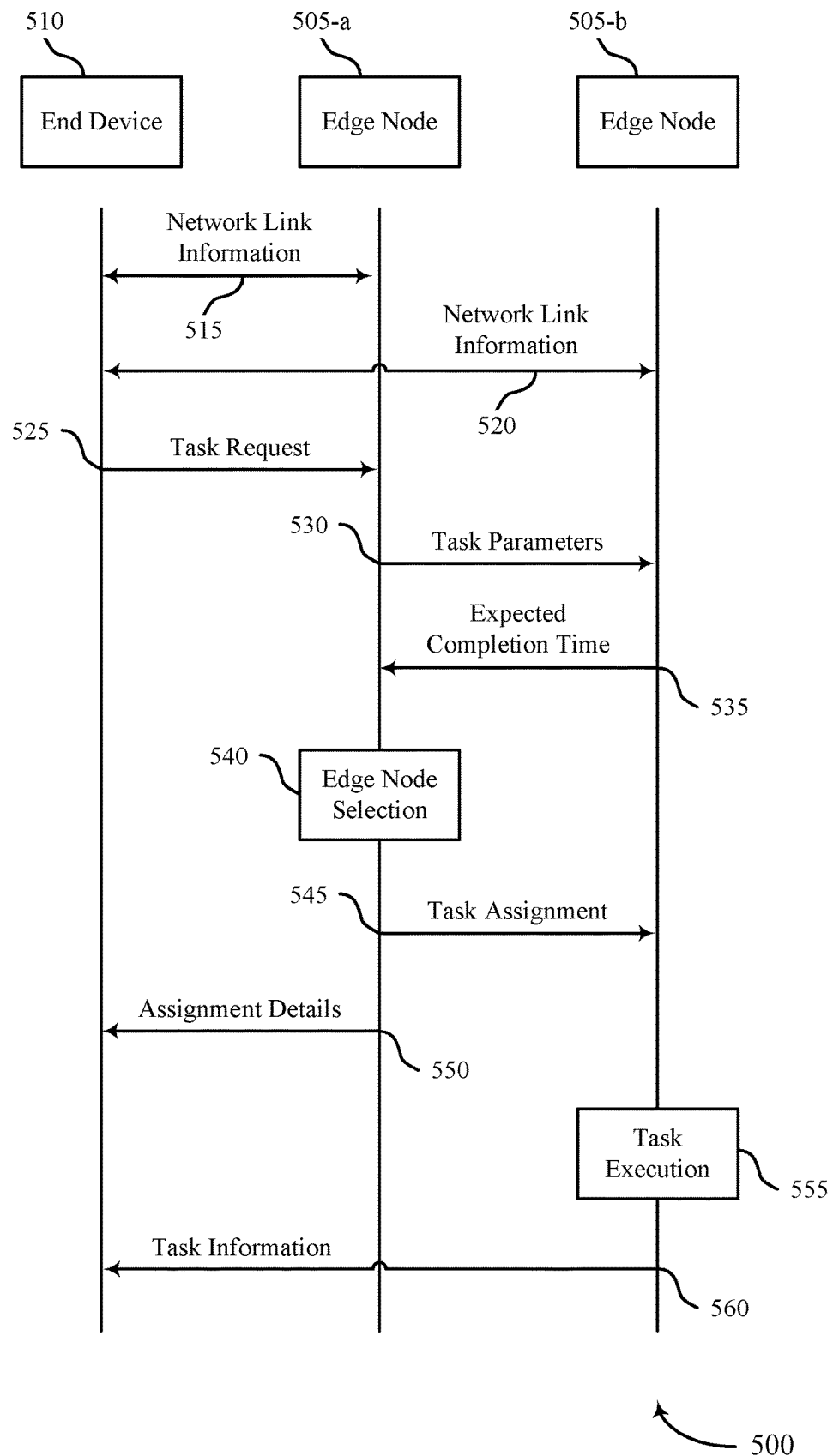
FIGS. 5 and 6 show example process flows that support intelligent cloud-edge resource management.

FIG. 5 shows an example process flow 500 that supports intelligent cloud-edge resource management. The process flow 500 may implement or be implemented by aspects of the wireless communications system 100, the system 200, the network 300, the network 400, or the network 401. For example, the process flow 500 includes an end device 510, which may be an example of one or more aspects of an end device 410 as described herein, including with reference to FIGS. 4A and 4B. The process flow 500 also includes edge nodes 505, each of which may be an example of one or more aspects of an edge node 405 as described herein, including with reference to FIGS. 4A and 4B. In the following description of the process flow 500, operations between the end device 510 and the edge nodes 505 may be added, omitted, or performed in a different order (with respect to the order shown).

The edge nodes 505 may be examples of compute devices that are capable of executing processing workloads from the end devices 510. In some implementations, the edge nodes 505 may be separated (such as physically, logically, or by other means). Alternatively, the edge nodes 505 may be co-located or connected via one or more wired or wireless communication links. In some implementations, the edge nodes 505 may be examples of APs associated with the same or different AP model. For example, the edge nodes 505 may be associated with a homogenous AP model or heterogenous AP models.

At 515, the end device 510 may exchange (such as transmit or receive, or both) network link information with the edge node 505-*a* via a first wireless communication link between the end device 510 and the edge node 505-*a*. Likewise, at 520, the end device 510 may exchange (such as transmit or receive, or both) network link information with the edge node 505-*b* via a second wireless communication link between the end device 510 and the edge node 505-*b*. In some implementations, the end device 510 may not need to send network link information to the edge node 505-*b* if, for example, topology information is available at the edge node 505-*a* (such as an orchestrator). The network link information may indicate predictive topology changes for one or both of the first wireless communication link or the second wireless communication link, quality metrics associated with one or both of the first wireless communication link or the second wireless communication link, mobility information associated with one or more of the edge nodes 505 or the end device 510, battery status information associated with one or more of the edge nodes 505 or the end device 510, or an aggregated processing capability of the edge nodes 505, among other examples.

At 525, the end device 510 may transmit a request for a processing task to at least the edge node 505-*a*. In some implementations, the end device 510 may transmit the request to only the edge node 505-*a*, as depicted in the example of FIG. 5. In some other implementations, the end device 510 may transmit the request to the edge node 505-*a* and at least one other edge node (such as the edge node 505-*b*). In the example of FIG. 5, the edge node 505-*a* may be an example of a master edge node that distributes processing task assignments to other edge nodes (such as the edge node 505-*b*) according to factors such as resource availability, current workload, and processing capability. Additionally, or alternatively, the edge node 505-*a* may be an example of a central resource manager that manages the distribution and execution of processing tasks for the end device 510. In some implementations, the end device 510 may select the edge node 505-*a* as the central resource manager for the end device 510 according to, for example, a proximity between the end device 510 and the edge node 505-*a*, a predicted location of the end device 510, a quality of the first wireless communication link between the end device 510 and the edge node 505-*a*, a resource availability of the edge node 505-*a*, or one or more other parameters indicated by or derived from the network link information.

At 530, the edge node 505-*a* may transmit an indication of one or more parameters associated with the processing task to the edge node 505-*b*. The one or more parameters may include, for example, a payload size associated with the processing task (such as a quantity of source data to be analyzed), a latency threshold for the processing task, performance criteria for the processing task (such as a desired resolution or throughput), a workload type associated with the processing task (such as a bounded job type, a periodic job type, a critical real-time job type, or a non-real-time job type), a priority of the processing task, or other pertinent information. The edge node 505-*a* also may provide the edge node 505-*b* with information associated with the end device 510, for example, to facilitate communications between the end device 510 and the edge node 505-*b* thereafter. Additionally, or alternatively, the edge node 505-*a* may provide the edge node 505-*b* with coherency information (such as historic data, network conditions, node availability, activity trends) indicated by or derived from the network link information.

At 535, the edge node 505-*b* may calculate an estimated completion time for the processing task according to the one or more parameters indicated by the edge node 505-*a*. The edge node 505-*b* may calculate the estimated completion time for the processing task according to, for example, a current or predicted availability of compute resources associated with the edge node 505-*b*, a current or predicted location of the edge node 505-*b*, a current or predicted location of the end device 510, a current or predicted quality of the second communication link between the end device 510 and the edge node 505-*b*, the workload type associated with the processing task, the payload size of the processing task, the priority of the processing task, the relative priority of other processing tasks assigned to the edge node 505-*b*, or other parameters associated with the processing task.

At 540, the edge node 505-*a* may select the edge node 505-*b* to handle the processing task according to the estimated completion time indicated by the edge node 505-*b*. In some implementations, the edge node 505-*a* may assign the processing task to the edge node 505-*b* according to current or predicted network conditions, a current or predicted workload of the edge node 505-*b* (or other edge nodes in the edge computing system), a current or predicted topology of the second wireless communication link between the end device 510 and the edge node 505-*b*, or other criteria. In some implementations (such as for XR applications), the edge node 505-*a* may assign a first portion of the processing task to the edge node 505-*b* and a second portion of the processing task to a different edge node. As such, the processing task may be decomposed and assigned to more than one edge node. At 545, the edge node 505-*a* may transmit an indication of the processing task assignment to the edge node 505-*b*. In some implementations, the edge node 505-*a* may provide the edge node 505-*b* (and other edge nodes in the edge computing system) with updated scheduling information that reflects the assignment of the processing task to the edge node 505-*b*.

At 550, the edge node 505-*a* may transmit an acknowledgement or confirmation of the processing task assignment to the end device 510. For example, the edge node 505-*a* may transmit an indication of an identifier of the edge node 505-*b*, an indication that the processing task has been assigned to the edge node 505-*b*, an indication of the estimated task completion time provided by the edge node 505-*b*, or other information pertaining to the processing task assignment. In some implementations, the end device 510 may establish a connection with the edge node 505-*b* according to the information provided by the edge node 505-*a* (such that the end device 510 can receive a result of the processing task from the edge node 505-*b*). For example, the end device 510 may perform a discovery procedure to identify and establish connectivity with the edge node 505-*b* using the identifier of the edge node 505-*b*.

At 555, the edge node 505-*b* may execute the processing task according to the parameters and conditions specified in the request. For example, the edge node 505-*b* may execute the processing task according to a latency target associated with the processing task, a relative priority of the processing task, a desired resolution for the processing task, or other similar criteria. The edge node 505-*b* may execute the processing task by generating, synthesizing, manipulating, or otherwise analyzing source data from the end device 510. In some implementations, the edge node 505-*b* may receive the source data from the end device 510 via the second wireless communication link between the end device 510 and the edge node 505-*b*. In some other implementations, the edge node 505-*b* may receive the source data via the edge node 505-*a*.

At 560, the edge node 505-*b* may transmit a result of the processing task to the end device 510. In some example, the result of the processing task may include output data (such as rendered video frames) or an analysis of source data provided by the end device 510 (such as a voice recognition analysis of audio data recorded by the end device 510). Additionally, or alternatively, the result of the processing task may include a confirmation or acknowledgement that the processing task is complete. For example, the edge node 505-*b* may render and upload one or more images captured by the end device 510 to a cloud server, and may transmit a notification to the end device 510 when the upload is finished. In some implementations, the result of the processing task may be conveyed to the end device 510 by the edge node 505-*a*.

Figure 6:
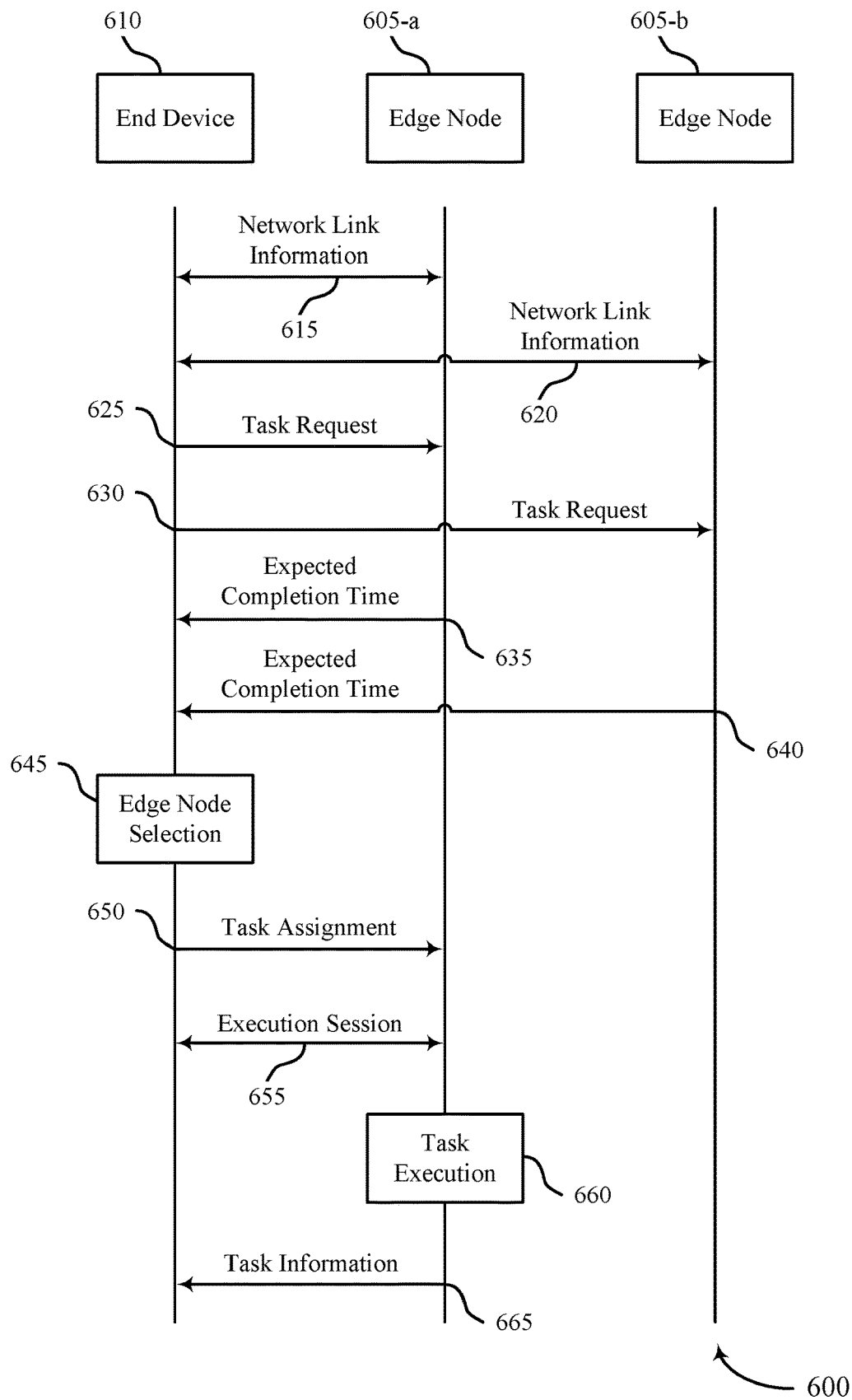

FIG. 6 shows an example process flow 600 that supports intelligent cloud-edge resource management. The process flow 600 may implement or be implemented by one or more aspects of the wireless communications system 100, the system 200, the network 300, the network 400, the network 401, or the process flow 500. For example, the process flow 600 includes an end device 610, which may be an example of one or more aspects of an end device 510 as described herein, including with reference to FIG. 5. The process flow 600 also includes edge nodes 605, each of which may be an example of one or more aspects of an edge node 505 as described herein, including with reference to FIG. 5. In the following description of the process flow 600, operations between the end device 610 and the edge nodes 605 may be added, omitted, or performed in a different order (with respect to the order shown).

At 615, the end device 610 may communicate network link information (which may be equivalently referred to as link topology information) with the edge node 605-*a*, where communicating with the edge node 605-*a* may include transmitting to or receiving from the edge node 605-*a*. Likewise, at 620, the end device 610 may communicate network link information with the edge node 605-*b*. The link information may indicate a topology, such as an updated topology, of one or more wireless communication links between the end device 610 and the edge nodes 605, workload information associated with the edge nodes 605, a battery level of the edge nodes 605, an aggregated processing capability of the edge nodes 605, quality metrics associated with the one or more wireless communication links between the end device 610 and the edge nodes 605, or mobility information associated with one or both of the end device 610 or the edge nodes 605.

At 625, the end device 610 may transmit a request for a processing task to the edge node 605-*a* via a first wireless communication link between the end device 610 and the edge node 605-*a*. Similarly, at 630, the end device 610 may transmit a request for the processing task to the edge node 605-*b* via a second wireless communication link between the end device 610 and the edge node 605-*b*. The request may indicate one or more parameters associated with the processing task. For example, the request may indicate a network QoS associated with the processing task, a payload size of the processing task (such as a quantity of source data associated with the processing task), a workload type associated with the processing task (such as a bounded job type, a periodic job type, a critical real-time job type, or a non-real-time job type), and other pertinent information.

At 635, the edge node 605-*a* may transmit an indication of an expected or estimated completion time for the processing task to the end device 610 via the first wireless communication link between the end device 610 and the edge node 605-*a*. Likewise, at 640, the edge node 605-*b* may transmit an indication of an expected or estimated completion time for the processing task to the end device 610 via the second wireless communication link between the end device 610 and the edge node 605-*b*. The edge nodes 605 may estimate the completion time for the processing task according to a current or predicted resource availability of the edge nodes 605, a current or predicted location of the end device 610, a current or predicted quality of the first and second communication links, the network link information, the one or more parameters associated with the processing task, or any combination thereof.

At 645, the end device 610 may perform an edge node selection process according to the expected completion times provided by the edge nodes 605. For example, if the expected task completion time for the edge node 605-*a* is lower than the expected task completion time for the edge node 605-*b*, the end device 610 may assign the processing task to the edge node 605-*a* at 650. Alternatively, if the expected task completion time for the edge node 605-*b* is lower than the expected task completion time for the edge node 605-*a*, the end device 610 may assign the processing task to the edge node 605-*b*. In some implementations, the end device 610 may consider other information (such as a distance or average signal quality for each of the edge nodes 605) when assigning the processing task to one of the edge nodes 605.

The end device 610 may consider other factors in addition to or as an alternative to expected task completion time. For example, the end device 610 may determine the highest security path or the lowest energy path for the processing task workload, and may assign the processing task accordingly. Likewise, the end device 610 may determine that the processing task involves more fast I/O resources (such as storage) than compute resources, and may assign the processing task accordingly. Some processing task workloads may be split between the edge (such as the edge nodes 605) and the cloud (such as the cloud edge 215 described herein, including with reference to FIG. 2). For example, face detection may be performed at the edge, while face recognition may be performed at the cloud. In some implementations, the end device 610 may autonomously manage task scheduling operations if, for example, the end device is a mission critical device. In such implementations, the end device 610 may have a dedicated compute node with guaranteed availability. This dedicated compute node may pause or drop other ongoing task workloads to execute tasks from the end device 610, or may proactively allocate compute resources for the processing task if the execution time of the processing task was previously scheduled (such as a periodic task that occurs every 15 minutes).

If the end device 610 assigns the processing task to the edge node 605-*a* (as shown in the example of FIG. 6), the end device 610 and the edge node 605-*a* may, in some implementations, establish a task execution session at 655. At 660, the edge node 605-*a* may execute the processing task according to the task parameters provided by the end device 610. In some implementations, the edge node 605-*a* may execute the processing task using source data from the end device 610. For example, the edge node 605-*a* may render a set of video frames provided by the end device 610, render an image captured by the end device 610, perform voice recognition on audio data recorded by the end device 610, or provide a semantic interpretation of an image received from the end device 610, among other examples. The edge node 605-*a* may consider the resource utilization associated with the processing task when calculating workload completion estimates for any subsequent requests (from the end device 610 or other edge devices).

At 665, the edge node 605-*a* may return a result of the processing task to the end device 610 in accordance with the task parameters specified by the end device 610. For example, the edge node 605-*a* may perform a facial recognition analysis of an image captured by the end device 610 and return a result of the facial recognition analysis to the end device 610 via the first communication link between the end device 610 and the edge node 605-*a*. Additionally, or alternatively, the edge node 605-*a* may output the result of the processing task to another entity in the edge computing system. For example, the edge node 605-*a* may render one or more video frames according to one or more resolution, latency, and throughput parameters indicated by the end device 610, and may output the rendered video frames to a cloud device, such as the cloud service 220 described with reference to FIG. 2. In some implementations, rather than sending a result back to the end device 610, the edge node 605-*a* may send an actuation command back to the end device 610 or another device in the system. For example, if the end device 610 is a smart thermostat, the edge node 605-*a* may transmit a command to raise or lower the temperature of the smart thermostat.

As described herein, the result of the processing task may include any data that is generated, synthesized, or derived from input data provided by the end device 610. For example, the result of the processing task may include a set of rendered frames (for a virtual reality (VR) or XR processing task), a numeric result of a calculation, one or more data packets, or other information generated during the processing task. Additionally, or alternatively, the result of the processing task may include an acknowledgement, a confirmation, or a notification from one or both of the edge nodes 605. For example, the end device 610 may receive an indication (from the edge node 605-*a*) that the processing task has been assigned to the edge node 605-*b*.

Figure 7:
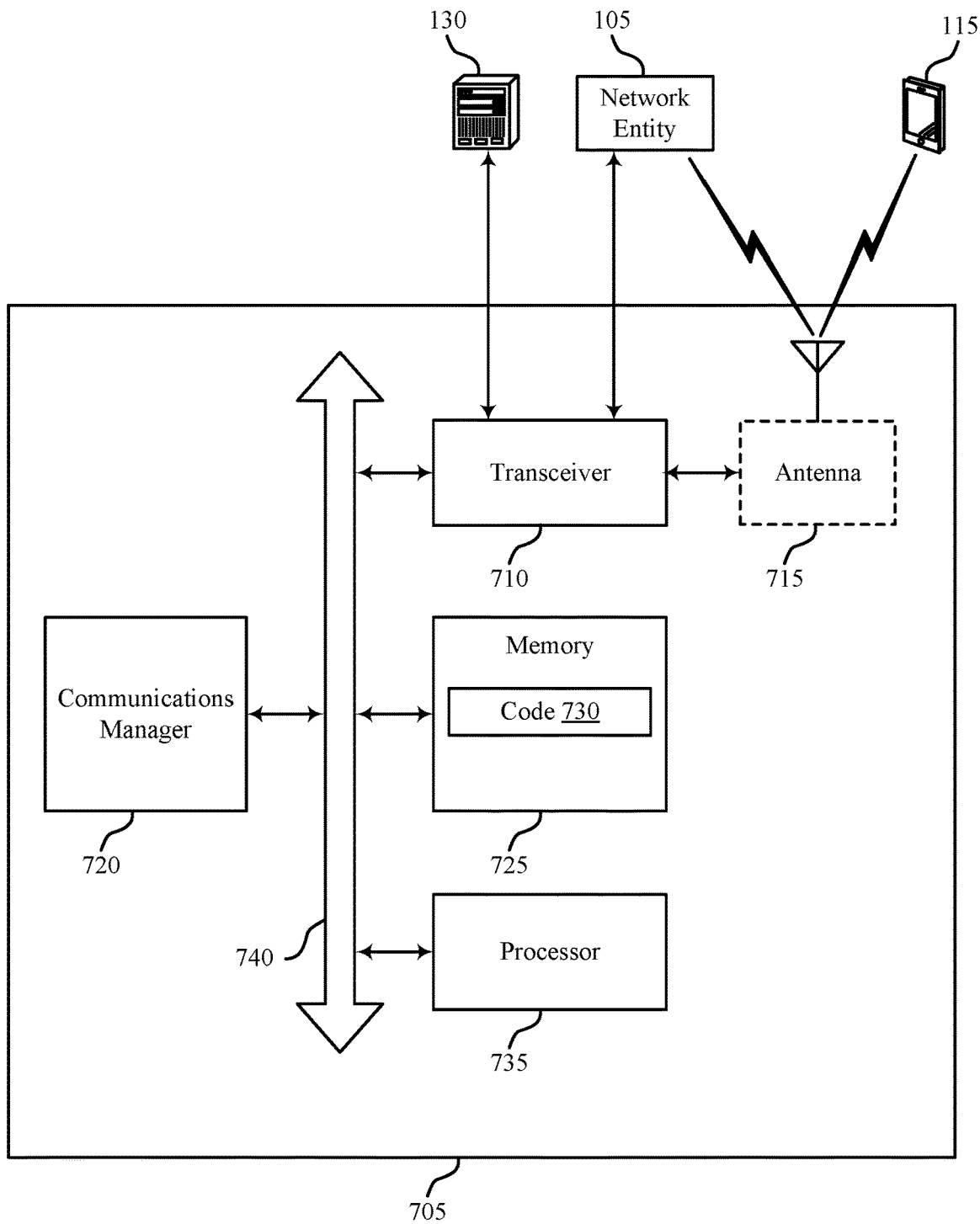
FIGS. 7 and 8 show block diagrams of example devices that support intelligent cloud-edge resource management.

FIG. 7 shows a block diagram 700 of an example device 705 that supports intelligent cloud-edge resource management. The device 705 may include components for bi-directional voice and data communications including components for transmitting and receiving communications, such as a communications manager 720, a transceiver 710, an antenna 715, a memory 725, code 730, and a processor 735. These components may be in electronic communication or otherwise coupled (such as operatively, communicatively, functionally, electronically, electrically) via one or more buses (such as a bus 740).

The transceiver 710 may support bi-directional communications via wired links, wireless links, or both as described herein. In some implementations, the transceiver 710 may include a wired transceiver and may communicate bi-directionally with another wired transceiver. Additionally, or alternatively, in some implementations, the transceiver 710 may include a wireless transceiver and may communicate bi-directionally with another wireless transceiver. In some implementations, the device 705 may include one or more antennas 715, which may be capable of transmitting or receiving wireless transmissions (such as concurrently). The transceiver 710 also may include a modem to modulate signals, to provide the modulated signals for transmission (such as by one or more antennas 715, by a wired transmitter), to receive modulated signals (such as from one or more antennas 715, from a wired receiver), and to demodulate signals. In some implementations, the transceiver 710 may include one or more interfaces, such as one or more interfaces coupled with the one or more antennas 715 that are configured to support various receiving or obtaining operations, or one or more interfaces coupled with the one or more antennas 715 that are configured to support various transmitting or outputting operations, or a combination thereof.

In some implementations, the transceiver 710 may include or be configured for coupling with one or more processors or memory components that are operable to perform or support operations in accordance with received or obtained information or signals, or to generate information or other signals for transmission or other outputting, or any combination thereof. In some implementations, the transceiver 710, or the transceiver 710 and the one or more antennas 715, or the transceiver 710 and the one or more antennas 715 and one or more processors or memory components (such as the processor 735, or the memory 725, or both), may be included in a chip or chip assembly that is installed in the device 705. In some implementations, the transceiver may be operable to support communications via one or more communications links (such as a communication link 125, a backhaul communication link 120, a midhaul communication link 162, a fronthaul communication link 168).

The memory 725 may include RAM and ROM. The memory 725 may store computer-readable, computer-executable code 730 including instructions that, when executed by the processor 735, cause the device 705 to perform various functions described herein. The code 730 may be stored in a non-transitory computer-readable medium such as system memory or another type of memory. In some implementations, the code 730 may not be directly executable by the processor 735 but may cause a computer (such as when compiled and executed) to perform functions described herein. In some implementations, the memory 725 may contain, among other things, a basic I/O system (BIOS), which may control basic hardware or software operation such as the interaction with peripheral components or devices.

The processor 735 may include an intelligent hardware device (such as a general-purpose processor, a digital signal processor (DSP), an application-specific integrated circuit (ASIC), a CPU, a GPU, a field-programmable gate array (FPGA), a microcontroller, a programmable logic device, discrete gate or transistor logic, a discrete hardware component, or any combination thereof). In some implementations, the processor 735 may be configured to operate a memory array using a memory controller. In some other implementations, a memory controller may be integrated into the processor 735. The processor 735 may be configured to execute computer-readable instructions stored in a memory (such as the memory 725) to cause the device 705 to perform various functions (such as functions or tasks supporting intelligent cloud-edge resource management). For example, the device 705 or a component of the device 705 may include a processor 735 and memory 725 coupled with the processor 735, the processor 735 and memory 725 configured to perform various functions described herein. The processor 735 may be an example of a cloud-computing platform (such as one or more physical nodes and supporting software such as operating systems, virtual machines, or container instances) that may host the functions (such as by executing code 730) to perform the functions of the device 705. The processor 735 may be any one or more suitable processors capable of executing scripts or instructions of one or more software programs stored in the device 705 (such as within the memory 725). In some implementations, the processor 735 may be a component of a processing system.

A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705, such as the processor 735, or the transceiver 710, or the communications manager 720, or other components or combinations of components of the device 705. The processing system of the device 705 may interface with other components of the device 705, and may process information received from other components (such as inputs or signals) or output information to other components.

For example, a chip or modem of the device 705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 705 may transmit information output from the chip or modem. Additionally, or alternatively, in some implementations, the one or more interfaces may refer to an interface between the processing system of the chip or modem and a receiver, such that the device 705 may obtain information or signal inputs, and the information may be passed to the processing system. A person having ordinary skill in the art will readily recognize that a first interface also may obtain information or signal inputs, and a second interface also may output information or signal outputs.

In some implementations, a bus 740 may support communications of (such as within) a protocol layer of a protocol stack. In some implementations, a bus 740 may support communications associated with a logical channel of a protocol stack (such as between protocol layers of a protocol stack), which may include communications performed within a component of the device 705, or between different components of the device 705 that may be co-located or located in different locations (such as where the device 705 may refer to a system in which one or more of the communications manager 720, the transceiver 710, the memory 725, the code 730, and the processor 735 may be located in one of the different components or divided between different components).

In some implementations, the communications manager 720 may manage aspects of communications with a core network 130 (such as via one or more wired or wireless backhaul links). For example, the communications manager 720 may manage the transfer of data communications for client devices, such as one or more UEs 115. In some implementations, the communications manager 720 may manage communications with other network entities 105, and may include a controller or scheduler for controlling communications with UEs 115 in cooperation with other network entities 105. In some implementations, the communications manager 720 may support an X2 interface within an LTE/LTE-A wireless communications network technology to provide communication between network entities 105.

The communications manager 720 (which may function as a controller or orchestrator) may control or otherwise manage a set of processing resources associated with the device 705. In some implementations, the communications manager 720 may be confined to managing processing resources that are locally accessible to or integrated with the device 705. In some other implementations, the communications manager 720 may be capable of and configured to manage processing resources associated with other devices that are visible to the device 705 (such as communication devices that are connected to the device 705 via one or more wireless communication links). Additionally, or alternatively, the communications manager 720 may be capable of and configured to manage any number of processing resources within a local network domain of the device 705. In such implementations, the device 705 may function as a central hub device that coordinates and orchestrates workload assignments amongst different processing elements distributed across the local network.

In some implementations, the local network domain of the device 705 may be sub-divided such that each sub-domain is managed by an instance (such as an instantiation) of the device 705. Accordingly, the aggregate local network may operate as multiple independent sub-networks, where each instance of the device 705 coordinates workloads amongst other nodes in a given sub-domain. The local network may, in some implementations, have a hierarchical structure in which one instance of the device 705 is designated as a master node that coordinates tasks for devices in other sub-domains of the local network. The designation of a master node may be static or dynamic, such that if the master node of one sub-domain experiences a failure or outage, remaining nodes may assume the role of the previous master node.

The communications manager 720, which may be an aspect of or otherwise associated with a processing system of the device 705, may support edge compute resource orchestration of end device processing tasks at a first edge node (such as the device 705) in accordance with examples as disclosed herein. For example, the communications manager 720 (such as the processing system) may be configured as or otherwise support a means for receiving or obtaining, from an end device, network link information associated with one or more wireless communication links between the end device and one or more edge nodes. The communications manager 720 (such as the processing system) may be configured as or otherwise support a means for receiving or obtaining, from the end device, a request associated with a processing task, where the request indicates one or more parameters associated with the processing task. The communications manager 720 (such as the processing system) may be configured as or otherwise support a means for transmitting or outputting, to a second edge node of the one or more edge nodes, an indication of an assignment of the processing task to the second edge node in accordance with the network link information and the one or more parameters associated with the processing task.

In some implementations, the communications manager 720 (such as the processing system) may be configured as or otherwise support a means for transmitting or obtaining coherency information to the one or more edge nodes to maintain coherency across the one or more edge nodes if the first edge node goes offline or becomes disconnected.

In some implementations, the communications manager 720 (such as the processing system) may be configured as or otherwise support a means for transmitting or outputting, to each of the one or more edge nodes, an indication of the one or more parameters associated with the processing task. In some implementations, the communications manager 720 (such as the processing system) may be configured as or otherwise support a means for receiving or obtaining, from one or more of the one or more edge nodes, an indication of an expected completion time for the processing task, where the assignment of the processing task to the second edge node is according to the expected completion time. In some implementations, the communications manager 720 (such as the processing system) may be capable of and configured to transmit or output, to each of the one or more edge nodes, an indication of a maximum completion time for the processing task (which may be associated with a maximum allowable latency associated with completion of the processing task). In some implementations, the communications manager 720 (such as the processing system) may be capable of and configured to receive or obtain, from at least one edge node, an indication of whether the at least one edge node can execute the processing task within the maximum completion time.

In some implementations, the communications manager 720 (such as the processing system) may be configured as or otherwise support a means for removing a transitory edge node (such as an edge node with periodic or intermittent availability) from a list of available edge nodes if the transitory edge node goes offline or becomes disconnected from the first edge node. In some implementations, the communications manager 720 (such as the processing system) may be configured as or otherwise support a means for transmitting or outputting, to at least one of a set of remaining edge nodes on the list of available edge nodes, an indication of a reassignment of one or more processing tasks from the transitory edge node to the at least one of the set of remaining edge nodes.

In some implementations, the communications manager 720 (such as the processing system) may be configured as or otherwise support a means for receiving or obtaining an indication that a transitory edge node is online. In some implementations, the communications manager 720 (such as the processing system) may be configured as or otherwise support a means for transmitting or outputting an indication of an assignment of one or more processing tasks from the one or more edge nodes to the transitory edge node that is online.

In some implementations, the communications manager 720 (such as the processing system) may be configured as or otherwise support a means for transmitting or outputting coherency information to the transitory edge node that is online.

In some implementations, the communications manager 720 (such as the processing system) may be configured as or otherwise support a means for receiving or obtaining an indication that the end device has selected the first edge node to be a resource management node for the end device.

In some implementations, the assignment of the processing task to the second edge node is according to at least one of a latency threshold associated with the processing task, a priority of the processing task, a workload type associated the processing task, a compute resource availability of the second edge node, a battery availability of the second edge node, a power connection status of the second edge node, or a quality metric associated with a communication link between the second edge node and the end device.

In some implementations, the network link information indicates one or more of a topology, (such as an updated topology) for the one or more wireless communication links, an aggregated processing capability of the one or more edge nodes, quality metrics associated with the one or more wireless communication links, a battery level of the one or more edge nodes, a power connection status of the one or more edge nodes, workload information associated with the one or more edge nodes, or predictive topology changes associated with the one or more wireless communication links.

In some implementations, the predictive topology changes are associated with at least one of a location of the end device with respect to the one or more edge nodes, a velocity of the end device with respect to the one or more edge nodes, motion trend data associated with the end device, or motion trend data associated with the one or more edge nodes.

In some implementations, the quality metrics include at least one of an effective bandwidth, a throughput level, a latency, or a SINR, each associated with the one or more wireless communication links. In some implementations, the assignment of the processing task to the second edge node is according to the topology (such as the updated topology) of the one or more wireless communication links.

In some implementations, the first edge node includes a resource management node that distributes processing tasks to the one or more edge nodes according to at least one of a predictive resource availability of the one or more edge nodes, a predictive topology of the one or more wireless communication links, or a user-selected task prioritization policy. In some implementations, the one or more parameters include at least one of a QoS threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task. As used herein, the term predictive resource availability may refer to a projected, calculated, or estimated state of compute resources at each of one or more edge nodes and may be projected, calculated, or estimated in accordance with historical data associated with processing operation or activity at each of the one or more edge nodes, a quantity of end devices within the system, or types (where different types may be associated with relatively higher or lower workloads) of the end devices within the system. Further, the term predictive topology change may refer to a projected, calculated, or estimated state of a wireless communication link that is derived from historical data associated with a wireless communication link or any one or more devices.

Predictive topology changes and predictive resource availability may, in some implementations, result from the mobility of edge nodes or end devices. For example, if the communications manager 720 determines that the device 705 will be unavailable during a specified time interval in accordance with calendar information extracted from one or more applications running on the device 705 (such as data that indicates an upcoming appointment or meeting), the communications manager 720 may use this information to estimate a predictive resource availability for the device 705. For further example, the communications manager 720 may learn, using an AI, ML, or other reinforcement learning technique, a mobility pattern of one or more devices. For example, if a vehicle is being actively driven, the communications manager 720 may determine that the vehicle is unavailable to host additional processing workloads, whereas a vehicle that is parked and charged (or charging) may be an available compute resource that can host additional processing workloads, regardless of where the vehicle is located. In other words, vehicles that are actively being used for a transportation task (such as a vehicle in a fleet that is currently making deliveries) may be unavailable to host additional processing workloads, while vehicles that are parked and charged (or charging) may be available to host additional processing workloads.

In some implementations, the workload type of the processing task includes at least one of a bounded workload type, a periodic workload type, a critical real-time workload type, or a non-real-time workload type. In some implementations, the end device includes one or more of a wireless station, a mobile device, a vehicle, a sensor, an XR device, an AR device, a video camera, or an IoT device. In some implementations, second edge node is different from the first edge node.

In some implementations, the communications manager 720 (such as the processing system) may be configured as or otherwise support a means for transmitting or outputting, to the end device, information associated with the second edge node and an indication of the assignment of the processing task to the second edge node, the information including at least an identifier of the second edge node.

In some implementations, the communications manager 720 (such as the processing system) may be configured as or otherwise support a means for transmitting or outputting, to the second edge node, a request for the second edge node to allocate a first quantity of compute resources for the processing task. In some implementations, the communications manager 720 (such as the processing system) may be configured as or otherwise support a means for receiving or obtaining, from the second edge node, a response indicating a second quantity of compute resources that are granted for the processing task, where the second quantity of resources is less than or equal to the first quantity of compute resources.

Additionally, or alternatively, the communications manager 720 (such as the processing system) may support edge compute resource orchestration of end device processing tasks at a second edge node (such as the device 705) in accordance with examples as disclosed herein. For example, the communications manager 720 (such as the processing system) may be configured as or otherwise support a means for receiving or obtaining, from a first edge node of one or more edge nodes or an end device, an indication of an assignment of a processing task to the second edge node, where the assignment of the processing task to the second edge node is according to one or more parameters associated with the processing task and network link information associated with one or more wireless communication links between the one or more edge nodes and the end device. The communications manager 720 (such as the processing system) may be configured as or otherwise support a means for transmitting or outputting, to one or both of the first edge node or the end device, information associated with the processing task in accordance with the one or more parameters associated with the processing task.

In some implementations, the communications manager 720 (such as the processing system) may be configured as or otherwise support a means for receiving or obtaining, from the first edge node or the end device, a query indicating the one or more parameters associated with the processing task. In some implementations, the communications manager 720 (such as the processing system) may be configured as or otherwise support a means for transmitting or outputting, to the first edge node or the end device, an indication of an expected completion time for the processing task, where the assignment of the processing task to the second edge node is according to the expected completion time. In some implementations, the second edge node may be the same as the first edge node. In other words, the second edge node may assign the processing task to itself. In some other implementations, the second edge node may be different (such as physically or logically separated) from the first edge node.

In some implementations, the one or more parameters include at least one of a QoS threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task. In some implementations, the second edge node queues the processing task in a processing pipeline of the second edge node in accordance with receiving the indication of the assignment of the processing task to the second edge node. In some implementations, the processing task includes at least one of a compute task, an I/O task, or a NAS task.

In some implementations, the communications manager 720 (such as the processing system) may be configured to perform various operations (such as receiving, obtaining, monitoring, outputting, transmitting) using or otherwise in cooperation with the transceiver 710, the one or more antennas 715 (such as where applicable), one or more interfaces, or any combination thereof. Although the communications manager 720 is shown as a separate component, in some implementations, one or more functions described with reference to the communications manager 720 may be supported by or performed by the transceiver 710, the processor 735, the memory 725, the code 730, or any combination thereof. For example, the code 730 may include instructions executable by the processor 735 to cause the device 705 to perform various aspects of intelligent cloud-edge resource management as described herein, or the processor 735 and the memory 725 may be otherwise configured to perform or support such operations.

Figure 8:
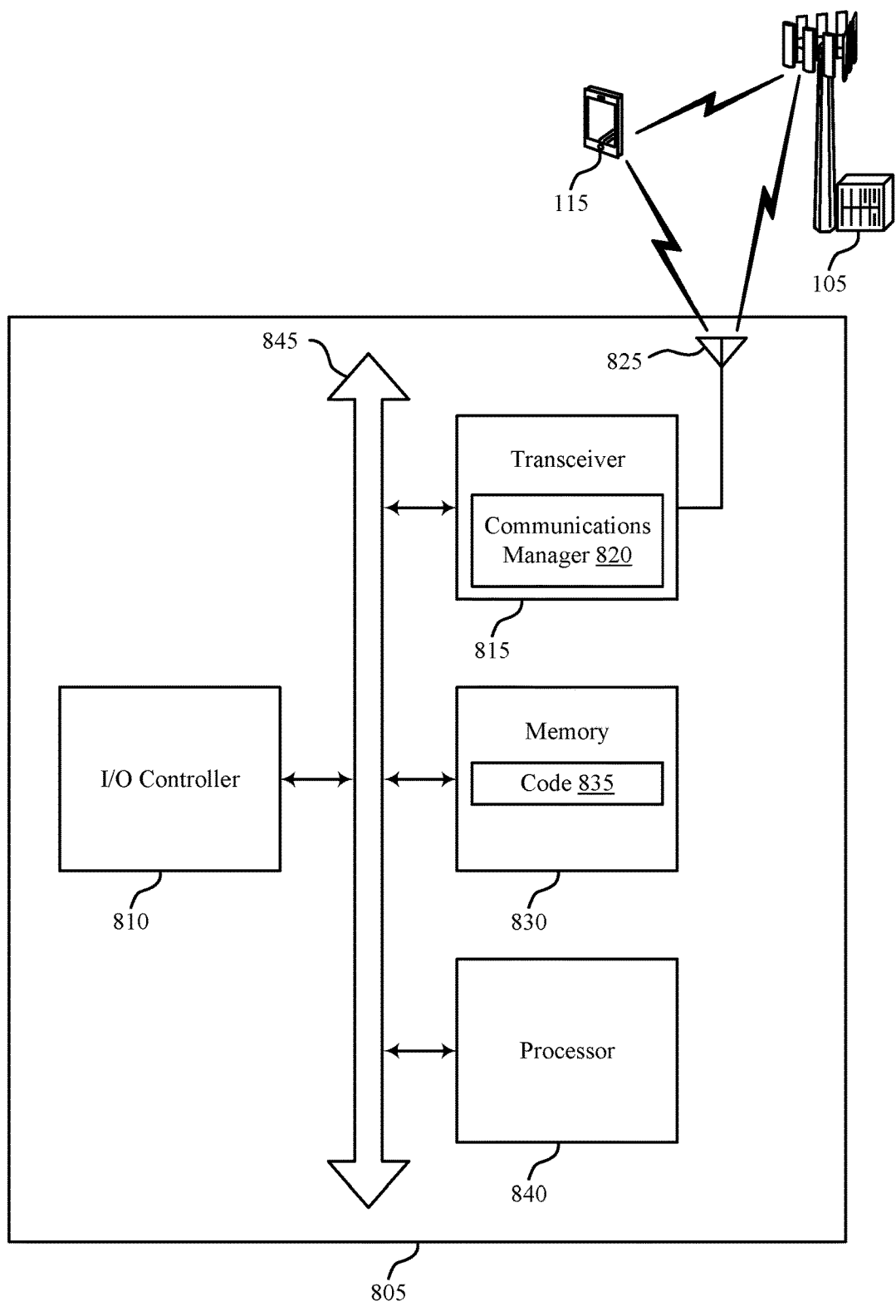

FIG. 8 shows a block diagram 800 of an example device 805 that supports intelligent cloud-edge resource management. The device 805 may include components for bi-directional voice and data communications including components for transmitting and receiving communications, such as a communications manager 820, an I/O controller 810, a transceiver 815, an antenna 825, a memory 830, code 835, and a processor 840. These components may be in electronic communication or otherwise coupled (such as operatively, communicatively, functionally, electronically, electrically) via one or more buses (such as a bus 845).

The I/O controller 810 may manage input and output signals for the device 805. The I/O controller 810 also may manage peripherals not integrated into the device 805. In some implementations, the I/O controller 810 may represent a physical connection or port to an external peripheral. In some implementations, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some implementations, the I/O controller 810 may be implemented as part of a processor or processing system, such as the processor 840. In some implementations, a user may interact with the device 805 via the I/O controller 810 or via hardware components controlled by the I/O controller 810.

In some implementations, the device 805 may include a single antenna 825. However, in some other implementations, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825.

In some implementations, the transceiver 815 may include one or more interfaces, such as one or more interfaces coupled with the one or more antennas 825 that are configured to support various receiving or obtaining operations, or one or more interfaces coupled with the one or more antennas 825 that are configured to support various transmitting or outputting operations, or a combination thereof. In some implementations, the transceiver 815 may include or be configured for coupling with one or more processors or memory components that are operable to perform or support operations in accordance with received or obtained information or signals, or to generate information or other signals for transmission or other outputting, or any combination thereof. In some implementations, the transceiver 815, or the transceiver 815 and the one or more antennas 825, or the transceiver 815 and the one or more antennas 825 and one or more processors or memory components (such as the processor 840, or the memory 830, or both), may be included in a chip or chip assembly that is installed in the device 805.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some implementations, the code 835 may not be directly executable by the processor 840 but may cause a computer (such as when compiled and executed) to perform functions described herein. In some implementations, the memory 830 may contain, among other things, a BIOS which may control basic hardware or software operation such as the interaction with peripheral components or devices.

The processor 840 may include an intelligent hardware device (such as a general-purpose processor, a DSP, an ASIC, a CPU, a GPU, an FPGA, a microcontroller, a programmable logic device, discrete gate or transistor logic, a discrete hardware component, or any combination thereof). In some implementations, the processor 840 may be configured to operate a memory array using a memory controller. In some other implementations, a memory controller may be integrated into the processor 840. The processor 840 may be configured to execute computer-readable instructions stored in a memory (such as the memory 830) to cause the device 805 to perform various functions (such as functions or tasks supporting intelligent cloud-edge resource management). For example, the device 805 or a component of the device 805 may include a processor 840 and memory 830 coupled with the processor 840, the processor 840 and memory 830 configured to perform various functions described herein. The processor 840 may be an example of a cloud-computing platform (such as one or more physical nodes and supporting software such as operating systems, virtual machines, or container instances) that may host the functions (such as by executing code 835) to perform the functions of the device 805. The processor 840 may be any one or more suitable processors capable of executing scripts or instructions of one or more software programs stored in the device 805 (such as within the memory 830). In some implementations, the processor 840 may be a component of a processing system.

A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 840, or the transceiver 815, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both.

The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

The communications manager 820, which may be an aspect of or otherwise associated with a processing system, may support edge compute resource orchestration of processing tasks at an end device (such as the device 805) in accordance with examples as disclosed herein. For example, the communications manager 820 (such as the processing system) may be configured as or otherwise support a means for transmitting or outputting network link information associated with one or more wireless communication links between the end device and one or more edge nodes. The communications manager 820 (such as the processing system) may be configured as or otherwise support a means for transmitting or outputting a request associated with a processing task to at least a first edge node of the one or more edge nodes, where the request indicates one or more parameters associated with the processing task. The communications manager 820 (such as the processing system) may be configured as or otherwise support a means for receiving or obtaining information associated with the processing task from a second edge node of the one or more edge nodes in accordance with the network link information and the one or more parameters associated with the processing task.

In some implementations, to support transmitting the request, the communications manager 820 (such as the processing system) may be configured as or otherwise support a means for transmitting or outputting the request to the one or more edge nodes via the one or more wireless communication links between the end device and the one or more edge nodes.

In some implementations, the communications manager 820 (such as the processing system) may be configured as or otherwise support a means for receiving or obtaining, in accordance with the request, an indication of an expected completion time for the processing task from one or more of the one or more edge nodes. In some implementations, the communications manager 820 (such as the processing system) may be configured as or otherwise support a means for transmitting or outputting an indication of a selection of the second edge node in accordance with the expected completion time for the second edge node, where the information associated with the processing task is received in accordance with the selection.

In some implementations, the communications manager 820 (such as the processing system) may be configured as or otherwise support a means for transmitting or outputting an indication that the end device has selected the first edge node to be a resource management node for the end device, where selection of the first edge node is in accordance with at least one of a quality metric associated with a wireless communication link between the first edge node and the end device, a compute resource availability of the first edge node, a mobility status of the first edge node (such as mobile or non-mobile), a power type associated with the first edge node (such as plugged in or battery operated), respective distances between the end device and the one or more edge nodes, or respective signal qualities associated with the one or more wireless communication links between the end device and the one or more edge nodes.

In some implementations, the network link information indicates at least one of a topology (such as an updated topology) for the one or more wireless communication links, an aggregated processing capability of the one or more edge nodes, quality metrics associated with the one or more wireless communication links, a battery level of the one or more edge nodes, a power connection status of the one or more edge nodes, workload information associated with the one or more edge nodes, or predictive topology changes associated with the one or more wireless communication links.

In some implementations, the predictive topology changes are associated with at least one of a location of the end device with respect to the one or more edge nodes, a velocity of the end device with respect to the one or more edge nodes, motion trend data associated with the end device, or motion trend data associated with the one or more edge nodes.

In some implementations, the quality metrics include at least one of an effective bandwidth, a throughput level, a latency, or a SINR, each associated with the one or more wireless communication links. In some implementations, the one or more parameters include at least one of a QoS threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

In some implementations, the workload type of the processing task includes at least one of a bounded workload type, a periodic workload type, a critical real-time workload type, or a non-real-time workload type. In some implementations, the end device includes one or more of a wireless station, a mobile device, a vehicle, a sensor, an XR device, an AR device, a video camera, or an IoT device.

In some implementations, the communications manager 820 (such as the processing system) may be configured to perform various operations (such as receiving, monitoring, transmitting) using or otherwise in cooperation with the transceiver 815, the one or more antennas 825, one or more interfaces, or any combination thereof. Although the communications manager 820 is shown as a component of the transceiver 815, in some implementations, one or more functions described with reference to the communications manager 820 may be supported by or performed by the transceiver 815, the processor 840, the memory 830, the code 835, or any combination thereof. For example, the code 835 may include instructions executable by the processor 840 to cause the device 805 to perform various aspects of intelligent cloud-edge resource management as described herein, or the processor 840 and the memory 830 may be otherwise configured to perform or support such operations.

Figure 9:
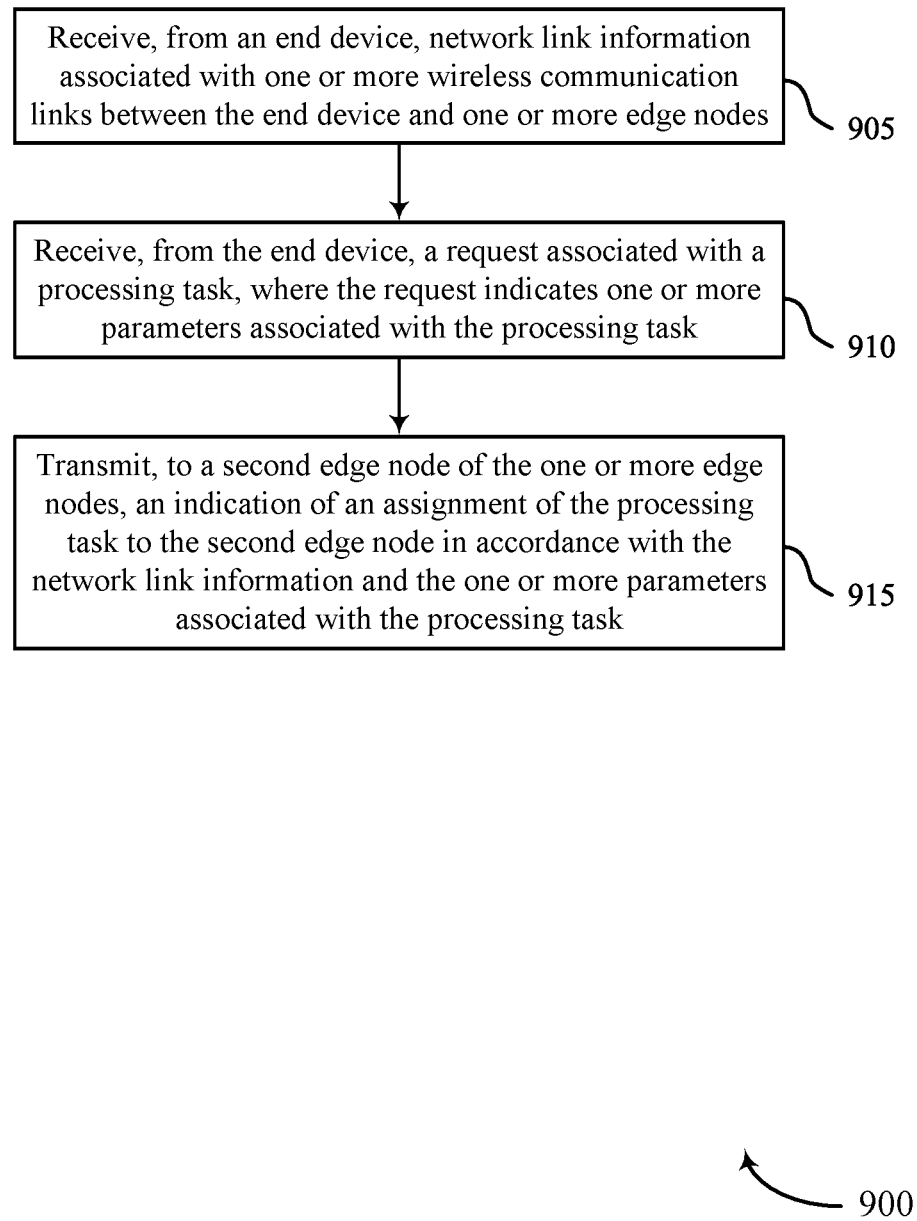
FIGS. 9-11 show flowcharts illustrating example methods that support intelligent cloud-edge resource management.

FIG. 9 shows a flowchart illustrating an example method 900 that supports intelligent cloud-edge resource management. The operations of the method 900 may be implemented by an edge node or components thereof. For example, the operations of the method 900 may be performed by an edge node 305 described herein, including with reference to FIG. 3. In some implementations, an edge node may execute a set of instructions to control the functional elements of the edge node to perform the described functions. Additionally, or alternatively, the edge node may perform aspects of the described functions using special-purpose hardware.

At 905, a first edge node may receive, from an end device, network link information associated with one or more wireless communication links between the end device and one or more edge nodes. The operations of 905 may be performed in accordance with examples as disclosed herein, such as by one or more interfaces or a processing system as disclosed herein.

At 910, the first edge node may receive, from the end device, a request associated with a processing task, where the request indicates one or more parameters associated with the processing task. The operations of 910 may be performed in accordance with examples as disclosed herein, such as by one or more interfaces or a processing system as disclosed herein.

At 915, the first edge node may transmit, to a second edge node of the one or more edge nodes, an indication of an assignment of the processing task to the second edge node in accordance with the network link information and the one or more parameters associated with the processing task. The operations of 915 may be performed in accordance with examples as disclosed herein, such as by one or more interfaces or a processing system as disclosed herein.

Figure 10:
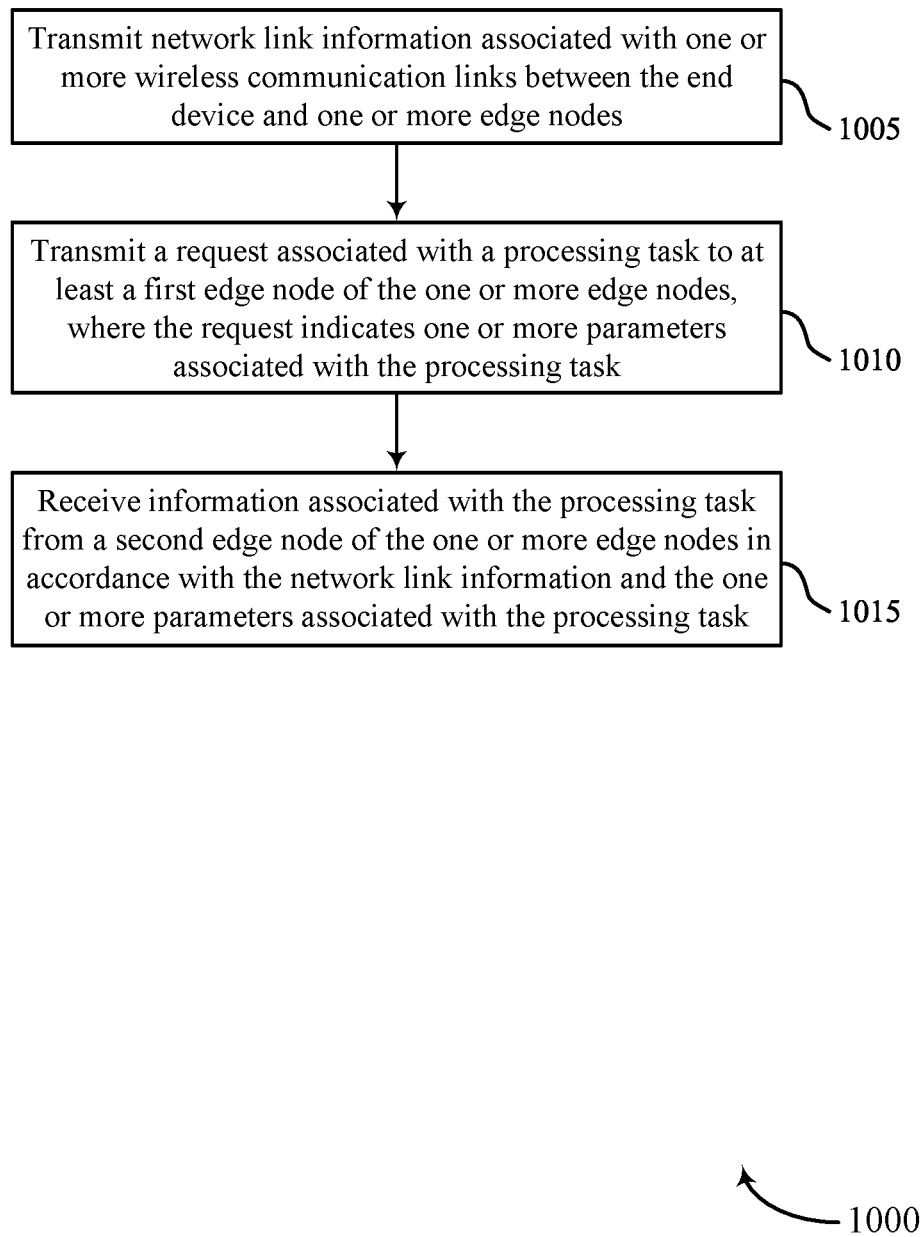

FIG. 10 shows a flowchart illustrating an example method 1000 that supports intelligent cloud-edge resource management. The operations of the method 1000 may be implemented by an end device or components thereof. For example, the operations of the method 1000 may be performed by an end device 210 described herein, including with reference to FIG. 2. In some implementations, an end device may execute a set of instructions to control the functional elements of the end device to perform the described functions. Additionally, or alternatively, the end device may perform aspects of the described functions using special-purpose hardware.

At 1005, the end device may transmit network link information associated with one or more wireless communication links between the end device and one or more edge nodes. The operations of 1005 may be performed in accordance with examples as disclosed herein, such as by one or more interfaces or a processing system as disclosed herein.

At 1010, the end device may transmit a request associated with a processing task to at least a first edge node of the one or more edge nodes, where the request indicates one or more parameters associated with the processing task. The operations of 1010 may be performed in accordance with examples as disclosed herein, such as by one or more interfaces or a processing system as disclosed herein.

At 1015, the end device may receive information associated with the processing task from a second edge node of the one or more edge nodes in accordance with the network link information and the one or more parameters associated with the processing task. The operations of 1015 may be performed in accordance with examples as disclosed herein, such as by one or more interfaces or a processing system as disclosed herein.

Figure 11:
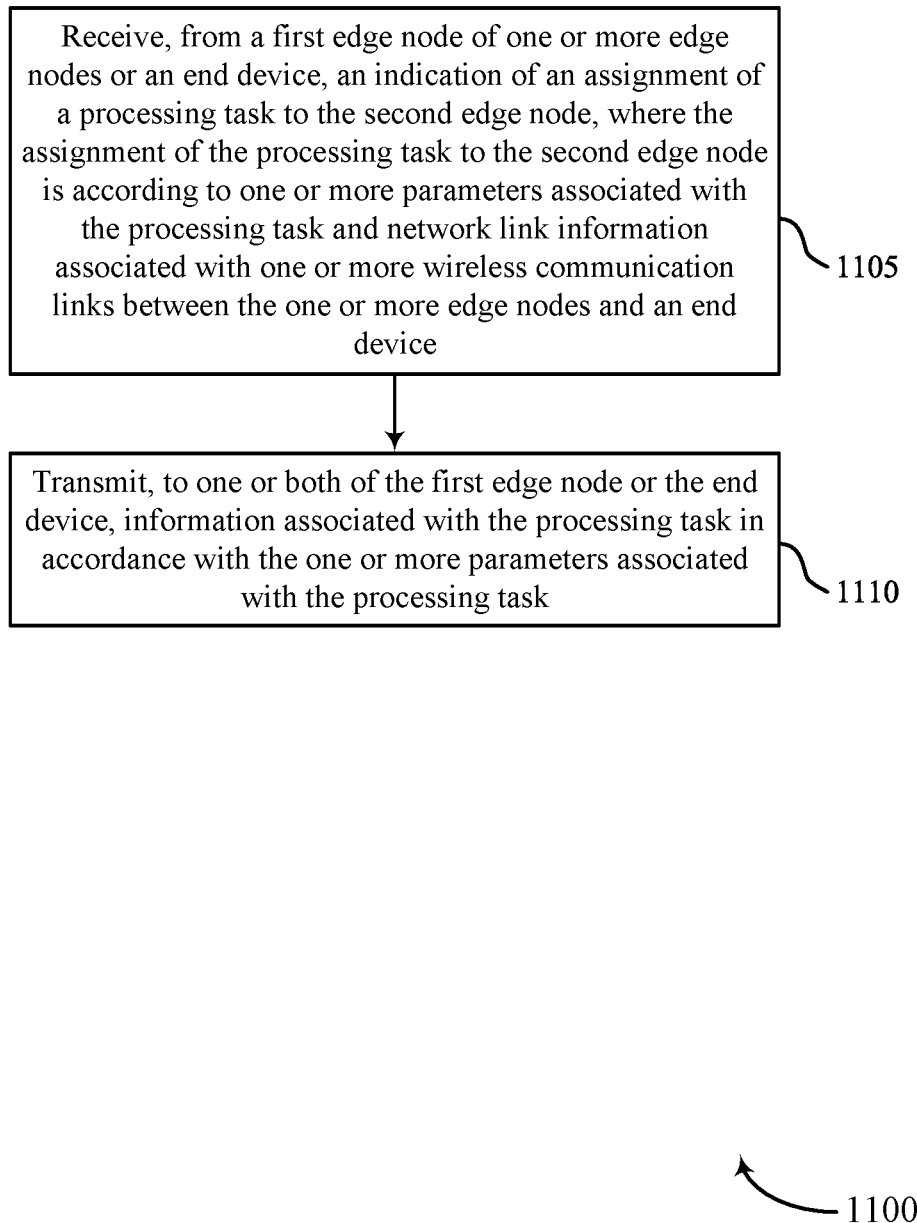

FIG. 11 shows a flowchart illustrating an example method 1100 that supports intelligent cloud-edge resource management. The operations of the method 1100 may be implemented by an edge node or components thereof. For example, the operations of the method 1100 may be performed by an edge node 205 described herein, including with reference to FIG. 2. In some implementations, an edge node may execute a set of instructions to control the functional elements of the edge node to perform the described functions. Additionally, or alternatively, the edge node may perform aspects of the described functions using special-purpose hardware.

At 1105, a second edge node may receive, from a first edge node of one or more edge nodes or an end device, an indication of an assignment of a processing task to the second edge node, where the assignment of the processing task to the second edge node is according to one or more parameters associated with the processing task and network link information associated with one or more wireless communication links between the one or more edge nodes and an end device. The operations of 1105 may be performed in accordance with examples as disclosed herein, such as by one or more interfaces or a processing system as disclosed herein.

At 1110, the second edge node may transmit, to one or both of the first edge node or the end device, information associated with the processing task in accordance with the one or more parameters associated with the processing task. The operations of 1110 may be performed in accordance with examples as disclosed herein, such as by one or more interfaces or a processing system as disclosed herein.

Implementation examples are described in the following numbered clauses:

Clause 1: An apparatus for edge compute resource orchestration of end device processing tasks at a first edge node, including: one or more interfaces configured to: obtain, from an end device, network link information associated with one or more wireless communication links between the end device and one or more edge nodes; obtain, from the end device, a request associated with a processing task, where the request indicates one or more parameters associated with the processing task; and output, to a second edge node of the one or more edge nodes, an indication of an assignment of the processing task to the second edge node in accordance with the network link information and the one or more parameters associated with the processing task.

Clause 2: The apparatus of clause 1, where the one or more interfaces are further configured to: output coherency information to the one or more edge nodes to maintain coherency across the one or more edge nodes if the first edge node goes offline or becomes disconnected from the one or more edge nodes.

Clause 3: The apparatus of any of clauses 1-2, where the one or more interfaces are further configured to: output, to each of the one or more edge nodes, an indication of the one or more parameters associated with the processing task; and obtain, from one or more of the one or more edge nodes, an indication of an expected completion time for the processing task, where the assignment of the processing task to the second edge node is according to the expected completion time.

Clause 4: The apparatus of any of clauses 1-3, where the apparatus further includes a processing system configured to: remove a transitory edge node from a list of available edge nodes if the transitory edge node goes offline or becomes disconnected from the first edge node; and where the one or more interfaces are further configured to: output, to at least one of a set of remaining edge nodes on the list of available edge nodes, an indication of a reassignment of one or more processing tasks from the transitory edge node to the at least one of the set of remaining edge nodes.

Clause 5: The apparatus of any of clauses 1-4, where the one or more interfaces are further configured to: obtain an indication that a transitory edge node is online; and output an indication of an assignment of one or more processing tasks from the one or more edge nodes to the transitory edge node that is online.

Clause 6: The apparatus of clause 5, where the one or more interfaces are further configured to: output coherency information to the transitory edge node that is online.

Clause 7: The apparatus of any of clauses 1-6, where the one or more interfaces are further configured to: obtain an indication that the end device has selected the first edge node to be a resource management node for the end device. Clause 8: The apparatus of any of clauses 1-7, where the assignment of the processing task to the second edge node is according to at least one of a latency threshold associated with the processing task, a priority of the processing task, a workload type associated the processing task, a compute resource availability of the second edge node, a battery availability of the second edge node, a power connection status of the second edge node, or a quality metric associated with a communication link between the second edge node and the end device.

Clause 9: The apparatus of any of clauses 1-8, where the network link information indicates one or more of a topology for the one or more wireless communication links, an aggregated processing capability of the one or more edge nodes, quality metrics associated with the one or more wireless communication links, a battery level of the one or more edge nodes, a power connection status of the one or more edge nodes, workload information associated with the one or more edge nodes, or predictive topology changes associated with the one or more wireless communication links.

Clause 10: The apparatus of clause 9, where the predictive topology changes are associated with at least one of a location of the end device with respect to the one or more edge nodes, a velocity of the end device with respect to the one or more edge nodes, motion trend data associated with the end device, or motion trend data associated with the one or more edge nodes.

Clause 11: The apparatus of any of clauses 9-10, where the quality metrics include at least one of an effective bandwidth, a throughput level, a latency, or a SINR, each associated with the one or more wireless communication links.

Clause 12: The apparatus of any of clauses 9-11, where the assignment of the processing task to the second edge node is according to the topology of the one or more wireless communication links.

Clause 13: The apparatus of any of clauses 1-12, where the first edge node includes a resource management node that distributes processing tasks to the one or more edge nodes according to at least one of a predictive resource availability of the one or more edge nodes, a predictive topology of the one or more wireless communication links, or a user-selected task prioritization policy.

Clause 14: The apparatus of any of clauses 1-13, where the one or more parameters include at least one of a QoS threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

Clause 15: The apparatus of clause 14, where the workload type of the processing task includes at least one of a bounded workload type, a periodic workload type, a critical real-time workload type, or a non-real-time workload type.

Clause 16: The apparatus of any of clauses 1-15, where the end device includes one or more of a wireless station, a mobile device, a vehicle, a sensor, an XR device, an AR device, a video camera, or an IoT device.

Clause 17: The apparatus of any of clauses 1-16, where the second edge node is different from the first edge node.

Clause 18: The apparatus of any of clauses 1-17, where the one or more interfaces are further configured to: output, to the end device, information associated with the second edge node and an indication of the assignment of the processing task to the second edge node, the information including at least an identifier of the second edge node.

Clause 19: The apparatus of any of clauses 1-18, where the one or more interfaces are further configured to: output, to the second edge node, a request for the second edge node to allocate a first quantity of compute resources for the processing task; and obtain, from the second edge node, a response indicating a second quantity of compute resources that are granted for the processing task, where the second quantity of resources is less than or equal to the first quantity of compute resources.

Clause 20: An apparatus for edge compute resource orchestration of processing tasks at an end device, including: one or more interfaces configured to: output network link information associated with one or more wireless communication links between the end device and one or more edge nodes; output a request associated with a processing task to at least a first edge node of the one or more edge nodes, where the request indicates one or more parameters associated with the processing task; and obtain information associated with the processing task from a second edge node of the one or more edge nodes in accordance with the network link information and the one or more parameters associated with the processing task.

Clause 21: The apparatus of clause 20, where, to output the request, the one or more interfaces are configured to: output the request to the one or more edge nodes via the one or more wireless communication links between the end device and the one or more edge nodes.

Clause 22: The apparatus of clause 21, where the one or more interfaces are further configured to: obtain, in accordance with outputting the request, an indication of an expected completion time for the processing task from one or more of the one or more edge nodes; and output an indication of a selection of the second edge node in accordance with the expected completion time for the second edge node, where the information associated with the processing task is obtained in accordance with the selection.

Clause 23: The apparatus of any of clauses 20-22, where the one or more interfaces are further configured to: output an indication that the end device has selected the first edge node to be a resource management node for the end device, where selection of the first edge node is in accordance with at least one of a quality metric associated with a wireless communication link between the first edge node and the end device, a compute resource availability of the first edge node, a mobility status of the first edge node, a power type associated with the first edge node, respective distances between the end device and the one or more edge nodes, or respective signal qualities associated with the one or more wireless communication links between the end device and the one or more edge nodes.

Clause 24: The apparatus of any of clauses 20-23, where the network link information indicates at least one of a topology for the one or more wireless communication links, an aggregated processing capability of the one or more edge nodes, quality metrics associated with the one or more wireless communication links, a battery level of the one or more edge nodes, a power connection status of the one or more edge nodes, workload information associated with the one or more edge nodes, or predictive topology changes associated with the one or more wireless communication links.

Clause 25: The apparatus of clause 24, where the predictive topology changes are associated with at least one of a location of the end device with respect to the one or more edge nodes, a velocity of the end device with respect to the one or more edge nodes, motion trend data associated with the end device, or motion trend data associated with the one or more edge nodes.

Clause 26: The apparatus of any of clauses 24-25, where the quality metrics include at least one of an effective bandwidth, a throughput level, a latency, or a SINR, each associated with the one or more wireless communication links.

Clause 27: The apparatus of any of clauses 20-26, where the one or more parameters include at least one of a QoS threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

Clause 28: The apparatus of clause 27, where the workload type of the processing task includes at least one of a bounded workload type, a periodic workload type, a critical real-time workload type, or a non-real-time workload type.

Clause 29: The apparatus of any of clauses 20-28, where the end device includes one or more of a wireless station, a mobile device, a vehicle, a sensor, an XR device, an AR device, a video camera, or an IoT device.

Clause 30: An apparatus for edge compute resource orchestration of end device processing tasks at a second edge node, including: one or more interfaces configured to: obtain, from a first edge node of one or more edge nodes or an end device, an indication of an assignment of a processing task to the second edge node, where the assignment of the processing task to the second edge node is according to one or more parameters associated with the processing task and network link information associated with one or more wireless communication links between the one or more edge nodes and the end device; and output, from the second edge node to one or both of the first edge node or the end device, information associated with the processing task in accordance with the one or more parameters associated with the processing task.

Clause 31: The apparatus of clause 30, where the one or more interfaces are further configured to: obtain, from the first edge node or the end device, a query indicating the one or more parameters associated with the processing task; and output, to the first edge node or the end device, an indication of an expected completion time for the processing task, where the assignment of the processing task to the second edge node is according to the expected completion time.

Clause 32: The apparatus of any of clauses 30-31, where the one or more parameters include at least one of a quality of service (QoS) threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

Clause 33: The apparatus of any of clauses 30-32, where the second edge node queues the processing task in a processing pipeline of the second edge node in accordance with obtaining the indication of the assignment of the processing task to the second edge node, and the processing task includes at least one of a compute task, an I/O task, or a NAS task.

Clause 34: A method for edge compute resource orchestration of end device processing tasks at a first edge node, including: receiving, from an end device, network link information associated with one or more wireless communication links between the end device and one or more edge nodes; receiving, from the end device, a request associated with a processing task, where the request indicates one or more parameters associated with the processing task; and transmitting, to a second edge node of the one or more edge nodes, an indication of an assignment of the processing task to the second edge node in accordance with the network link information and the one or more parameters associated with the processing task.

Clause 35: The method of clause 34, further including: transmitting coherency information to the one or more edge nodes to maintain coherency across the one or more edge nodes if the first edge node goes offline or becomes disconnected from the one or more edge nodes.

Clause 36: The method of any of clauses 34-35, further including: transmitting, to each of the one or more edge nodes, an indication of the one or more parameters associated with the processing task; and receiving, from one or more of the one or more edge nodes, an indication of an expected completion time for the processing task, where the assignment of the processing to the second edge node is according to the expected completion time.

Clause 37: The method of any of clauses 34-36, further including: removing a transitory edge node from a list of available edge nodes if the transitory edge node goes offline or becomes disconnected from the first edge node; and transmitting, to at least one of a set of remaining edge nodes on the list of available edge nodes, an indication of a reassignment of one or more processing tasks from the transitory edge node to the at least one of the set of remaining edge nodes.

Clause 38: The method of any of clauses 34-37, further including: receiving an indication that a transitory edge node is online; and transmitting an indication of an assignment of one or more processing tasks from the one or more edge nodes to the transitory edge node that is online.

Clause 39: The method of clause 38, further including: transmitting coherency information to the transitory edge node that is online.

Clause 40: The method of any of clauses 34-39, further including: receiving an indication that the end device has selected the first edge node to be a resource management node for the end device.

Clause 41: The method of any of clauses 34-40, where the assignment of the processing task to the second edge node is according to at least one of a latency threshold associated with the processing task, a priority of the processing task, a workload type associated the processing task, a compute resource availability of the second edge node, a battery availability of the second edge node, a power connection status of the second edge node, or a quality metric associated with a communication link between the second edge node and the end device.

Clause 42: The method of any of clauses 34-41, where the network link information indicates one or more of a topology for the one or more wireless communication links, an aggregated processing capability of the one or more edge nodes, quality metrics associated with the one or more wireless communication links, a battery level of the one or more edge nodes, a power connection status of the one or more edge nodes, workload information associated with the one or more edge nodes, or predictive topology changes associated with the one or more wireless communication links.

Clause 43: The method of clause 42, where the predictive topology changes are associated with at least one of a location of the end device with respect to the one or more edge nodes, a velocity of the end device with respect to the one or more edge nodes, motion trend data associated with the end device, or motion trend data associated with the one or more edge nodes.

Clause 44: The method of any of clauses 42-43, where the quality metrics include at least one of an effective bandwidth, a throughput level, a latency, or a SINR, each associated with the one or more wireless communication links.

Clause 45: The method of any of clauses 42-44, where the assignment of the processing task to the second edge node is according to the topology of the one or more wireless communication links.

Clause 46: The method of any of clauses 34-45, where the first edge node includes a resource management node that distributes processing tasks to the one or more edge nodes according to at least one of a predictive resource availability of the one or more edge nodes, a predictive topology of the one or more wireless communication links, or a user-selected task prioritization policy.

Clause 47: The method of any of clauses 34-46, where the one or more parameters include at least one of a QoS threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

Clause 48: The method of clause 47, where the workload type of the processing task includes at least one of a bounded workload type, a periodic workload type, a critical real-time workload type, or a non-real-time workload type.

Clause 49: The method of any of clauses 34-48, where the end device includes one or more of a wireless station, a mobile device, a vehicle, a sensor, an XR device, an AR device, a video camera, or an IoT device.

Clause 50: The method of any of clauses 34-49, where the second edge node is different from the first edge node.

Clause 51: The method of any of clauses 34-50, further including: transmitting, to the end device, information associated with the second edge node and an indication of the assignment of the processing task to the second edge node, the information including at least an identifier of the second edge node.

Clause 52: The method of any of clauses 34-51, further including: transmitting, to the second edge node, a request for the second edge node to allocate a first quantity of compute resources for the processing task; and receiving, from the second edge node, a response indicating a second quantity of compute resources that are granted for the processing task, where the second quantity of resources is less than or equal to the first quantity of compute resources.

Clause 53: A method for edge compute resource orchestration of processing tasks at an end device, including: transmitting network link information associated with one or more wireless communication links between the end device and one or more edge nodes; transmitting a request associated with a processing task to at least a first edge node of the one or more edge nodes, where the request indicates one or more parameters associated with the processing task; and receiving information associated with the processing task from a second edge node of the one or more edge nodes in accordance with the network link information and the one or more parameters associated with the processing task.

Clause 54: The method of clause 53, where transmitting the request includes: transmitting the request to the one or more edge nodes via the one or more wireless communication links between the end device and the one or more edge nodes.

Clause 55: The method of clause 54, further including: receiving, in accordance with transmitting the request, an indication of an expected completion time for the processing task from one or more of the one or more edge nodes; and transmitting an indication of a selection of the second edge node in accordance with the expected completion time for the second edge node, where the information associated with the processing task is received in accordance with the selection.

Clause 56: The method of any of clauses 53-55, further including: transmitting an indication that the end device has selected the first edge node to be a resource management node for the end device, where selection of the first edge node is in accordance with at least one of a quality metric associated with a wireless communication link between the first edge node and the end device, a compute resource availability of the first edge node, a mobility status of the first edge node, a power type associated with the first edge node, respective distances between the end device and the one or more edge nodes, or respective signal qualities associated with the one or more wireless communication links between the end device and the one or more edge nodes.

Clause 57: The method of any of clauses 53-56, where the network link information indicates at least one of a topology for the one or more wireless communication links, an aggregated processing capability of the one or more edge nodes, quality metrics associated with the one or more wireless communication links, a battery level of the one or more edge nodes, a power connection status of the one or more edge nodes, workload information associated with the one or more edge nodes, or predictive topology changes associated with the one or more wireless communication links.

Clause 58: The method of clause 57, where the predictive topology changes are associated with at least one of a location of the end device with respect to the one or more edge nodes, a velocity of the end device with respect to the one or more edge nodes, motion trend data associated with the end device, or motion trend data associated with the one or more edge nodes.

Clause 59: The method of any of clauses 57-58, where the quality metrics include at least one of an effective bandwidth, a throughput level, a latency, or a SINR, each associated with the one or more wireless communication links.

Clause 60: The method of any of clauses 53-59, where the one or more parameters include at least one of a QoS threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

Clause 61: The method of clause 60, where the workload type of the processing task includes at least one of a bounded workload type, a periodic workload type, a critical real-time workload type, or a non-real-time workload type.

Clause 62: The method of any of clauses 53-61, where the end device includes one or more of a wireless station, a mobile device, a vehicle, a sensor, an XR device, an AR device, a video camera, or an IoT device.

Clause 63: The method of any of clauses 53-62, where the second edge node is different from the first edge node.

Clause 64: A method for edge compute resource orchestration of end device processing tasks at a second edge node, including: receiving, from a first edge node of one or more edge nodes or an end device, an indication of an assignment of a processing task to the second edge node, where the assignment of the processing task to the second edge node is according to: one or more parameters associated with the processing task, and network link information associated with one or more wireless communication links between the one or more edge nodes and the end device; and transmitting, to one or both of the first edge node or the end device, information associated with the processing task in accordance with the one or more parameters associated with the processing task.

Clause 65: The method of clause 64, further including: receiving, from the first edge node or the end device, a query indicating the one or more parameters associated with the processing task; and transmitting, to the first edge node or the end device, an indication of an expected completion time for the processing task, where the assignment of the processing task to the second edge node is according to the expected completion time.

Clause 66: The method of any of clauses 64-65, where the one or more parameters include at least one of a quality of service (QoS) threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

Clause 67: The method of any of clauses 64-66, where the second edge node queues the processing task in a processing pipeline of the second edge node in accordance with receiving the indication of the assignment of the processing task to the second edge node, and the processing task includes at least one of a compute task, an I/O task, or a NAS task.

Clause 68: An apparatus for edge compute resource orchestration of end device processing tasks at a first edge node, including: means for receiving, from an end device, network link information associated with one or more wireless communication links between the end device and one or more edge nodes; means for receiving, from the end device, a request associated with a processing task, where the request indicates one or more parameters associated with the processing task; and means for transmitting, to a second edge node of the one or more edge nodes, an indication of an assignment of the processing task to the second edge node in accordance with the network link information and the one or more parameters associated with the processing task.

Clause 69: An apparatus for edge compute resource orchestration of processing tasks at an end device, including: means for transmitting network link information associated with one or more wireless communication links between the end device and one or more edge nodes; means for transmitting a request associated with a processing task to at least a first edge node of the one or more edge nodes, where the request indicates one or more parameters associated with the processing task; and means for receiving information associated with the processing task from a second edge node of the one or more edge nodes in accordance with the network link information and the one or more parameters associated with the processing task.

Clause 70: An apparatus for edge compute resource orchestration of end device processing tasks at a second edge node, including: means for receiving, from a first edge node of one or more edge nodes or an end device, an indication of an assignment of a processing task to the second edge node, where the assignment of the processing task to the second edge node is according to one or more parameters associated with the processing task and network link information associated with one or more wireless communication links between the one or more edge nodes and the end device; and means for transmitting, to one or both of the first edge node or the end device, information associated with the processing task in accordance with the one or more parameters associated with the processing task.

Clause 71: A non-transitory computer-readable medium storing code for edge compute resource orchestration of end device processing tasks at a first edge node, the code including instructions executable by a processor to: receive, from an end device, network link information associated with one or more wireless communication links between the end device and one or more edge nodes; receive, from the end device, a request associated with a processing task, where the request indicates one or more parameters associated with the processing task; and transmit, to a second edge node of the one or more edge nodes, an indication of an assignment of the processing task to the second edge node in accordance with the network link information and the one or more parameters associated with the processing task.

Clause 72: A non-transitory computer-readable medium storing code for edge compute resource orchestration of processing tasks at an end device, the code including instructions executable by a processor to: transmit network link information associated with one or more wireless communication links between the end device and one or more edge nodes; transmit a request associated with a processing task to at least a first edge node of the one or more edge nodes, where the request indicates one or more parameters associated with the processing task; and receive information associated with the processing task from a second edge node of the one or more edge nodes in accordance with the network link information and the one or more parameters associated with the processing task.

Clause 73: A non-transitory computer-readable medium storing code for edge compute resource orchestration of end device processing tasks at a second edge node, the code including instructions executable by a processor to: receive, from a first edge node of one or more edge nodes or an end device, an indication of an assignment of a processing task to the second edge node, where the assignment of the processing task to the second edge node is according to one or more parameters associated with the processing task and network link information associated with one or more wireless communication links between the one or more edge nodes and the end device; and transmit, to one or both of the first edge node or the end device, information associated with the processing task in accordance with the one or more parameters associated with the processing task.

Clause 74: A computer program comprising instructions that, when executed on a processor, cause the processor to perform a method of any one of clauses 34-67.

Clause 75: An apparatus comprising a processing system capable of and configured to perform a method of any one of clauses 34-67.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and shown in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer.

Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in some combinations and even initially claimed as such, one or more features from a claimed combination can be excised from the combination, and the claimed combination may be directed to a sub-combination or variation of a sub-combination.

Similarly, while operations are depicted in the drawings in a particular order, this is not be understood as requiring that such operations be performed in the particular order shown or in sequential order, or that all operations be performed, to achieve desirable results. Further, the drawings may schematically depict one more example processes in the form of a flow diagram. However, other operations that are not depicted can be incorporated in the example processes that are schematically shown. For example, one or more additional operations can be performed before, after, simultaneously, or between any of the operations. In some circumstances, multitasking and parallel processing may be advantageous. Moreover, the separation of various system components in the implementations described above may not require such separation in all implementations, and it is to be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A first edge node, comprising:
a processing system that includes one or more processors and one or more memories coupled with the one or more processors, the processing system configured to cause the first edge node to:
obtain, from an end device, network link information associated with a plurality of wireless communication links between the end device and a plurality of edge nodes;
obtain, from the end device, a request associated with a processing task, wherein the request indicates one or more parameters associated with the processing task; and
output, to a second edge node of the plurality of edge nodes, an indication of an assignment of the processing task to the second edge node in accordance with the network link information associated with a wireless communication link between the end device and the second edge node and in accordance with the one or more parameters associated with the processing task.

2. The first edge node of claim 1, wherein the processing system is further configured to cause the first edge node to:
output coherency information to the plurality of edge nodes to maintain coherency across the plurality of edge nodes if the first edge node goes offline or becomes disconnected from the plurality of edge nodes.

3. The first edge node of claim 1, wherein the processing system is further configured to cause the first edge node to:
output, to each of the plurality of edge nodes, an indication of the one or more parameters associated with the processing task; and
obtain, from one or more of the plurality of edge nodes, an indication of an expected completion time for the processing task, wherein the assignment of the processing task to the second edge node is according to the expected completion time.

4. The first edge node of claim 1, wherein the processing system is configured to cause the first edge node to:
remove a transitory edge node from a list of available edge nodes if the transitory edge node goes offline or becomes disconnected from the first edge node; and
output, to at least one of a set of remaining edge nodes on the list of available edge nodes, an indication of a reassignment of one or more processing tasks from the transitory edge node to the at least one of the set of remaining edge nodes.

5. The first edge node of claim 1, wherein the processing system is further configured to cause the first edge node to:
obtain an indication that a transitory edge node is online; and
output an indication of an assignment of one or more processing tasks from the plurality of edge nodes to the transitory edge node that is online.

6. The first edge node of claim 5, wherein the processing system is further configured to cause the first edge node to:
output coherency information to the transitory edge node that is online.

7. The first edge node of claim 1, wherein the processing system is further configured to cause the first edge node to:
obtain an indication that the end device has selected the first edge node to be a resource management node for the end device.

8. The first edge node of claim 1, wherein the assignment of the processing task to the second edge node is according to at least one of a latency threshold associated with the processing task, a priority of the processing task, a workload type associated the processing task, a compute resource availability of the second edge node, a battery availability of the second edge node, a power connection status of the second edge node, or a quality metric associated with a communication link between the second edge node and the end device.

9. The first edge node of claim 1, wherein the network link information indicates one or more of a topology for the plurality of wireless communication links, an aggregated processing capability of the plurality of edge nodes, quality metrics associated with the plurality of wireless communication links, a power connection status of the plurality of edge nodes, workload information associated with the plurality of edge nodes, or predictive topology changes associated with the plurality of wireless communication links.

10. The first edge node of claim 9, wherein the predictive topology changes are associated with at least one of a location of the end device with respect to the plurality of edge nodes, a velocity of the end device with respect to the plurality of edge nodes, motion trend data associated with the end device, or motion trend data associated with the plurality of edge nodes.

11. The first edge node of claim 9, wherein the quality metrics comprise at least one of an effective bandwidth, a throughput level, a latency, or a signal to interference and noise ratio (SINR), each associated with the plurality of wireless communication links.

12. The first edge node of claim 9, wherein:
the network link information indicates the topology for the plurality of wireless communication links, and
the assignment of the processing task to the second edge node is according to the topology of the plurality of wireless communication links.

13. The first edge node of claim 1, wherein the first edge node comprises a resource management node that distributes processing tasks to the plurality of edge nodes according to at least one of a predictive resource availability of the plurality of edge nodes, a predictive topology of the plurality of wireless communication links, or a user-selected task prioritization policy.

14. The first edge node of claim 1, wherein the one or more parameters comprise at least one of a quality of service (QoS) threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

15. The first edge node of claim 14, wherein the workload type of the processing task comprises at least one of a bounded workload type, a periodic workload type, a critical real-time workload type, or a non-real-time workload type.

16. The first edge node of claim 1, wherein the processing system is further configured to cause the first edge node to:
output, to the end device, information associated with the second edge node and an indication of the assignment of the processing task to the second edge node, the information comprising at least an identifier of the second edge node.

17. The first edge node of claim 1, wherein the processing system is further configured to cause the first edge node to:
output, to the second edge node, a request for the second edge node to allocate a first quantity of compute resources for the processing task; and
obtain, from the second edge node, a response indicating a second quantity of compute resources that are granted for the processing task, wherein the second quantity of resources is less than or equal to the first quantity of compute resources.

18. An end device, comprising:
a processing system that includes one or more processors and one or more memories coupled with the one or more processors, the processing system configured to cause the end device to:
output network link information associated with a plurality of wireless communication links between the end device and a plurality of edge nodes;
output a request associated with a processing task to at least a first edge node of the plurality of edge nodes, wherein the request indicates one or more parameters associated with the processing task; and
obtain information associated with the processing task from a second edge node of the plurality of edge nodes in accordance with the network link information associated with a wireless communication link between the end device and the second edge node and in accordance with the one or more parameters associated with the processing task.

19. The end device of claim 18, wherein, to output the request, the processing system is configured to:
output the request to the plurality of edge nodes via the plurality of wireless communication links between the end device and the plurality of edge nodes.

20. The end device of claim 19, wherein the processing system is further configured to cause the end device to:
obtain, in accordance with outputting the request, an indication of an expected completion time for the processing task from one or more of the plurality of edge nodes; and
output an indication of a selection of the second edge node in accordance with the expected completion time for the second edge node, wherein the information associated with the processing task is obtained in accordance with the selection.

21. The end device of claim 18, wherein the processing system is further configured to cause the end device to:
output an indication that the end device has selected the first edge node to be a resource management node for the end device, wherein selection of the first edge node is in accordance with at least one of a quality metric associated with a wireless communication link between the first edge node and the end device, a compute resource availability of the first edge node, a mobility status of the first edge node, a power type associated with the first edge node, respective distances between the end device and the plurality of edge nodes, or respective signal qualities associated with the plurality of wireless communication links between the end device and the plurality of edge nodes.

22. The end device of claim 18, wherein the network link information indicates at least one of a topology for the plurality of wireless communication links, an aggregated processing capability of the plurality of edge nodes, quality metrics associated with the plurality of wireless communication links, a power connection status of the plurality of edge nodes, workload information associated with the plurality of edge nodes, or predictive topology changes associated with the plurality of wireless communication links.

23. The end device of claim 22, wherein the predictive topology changes are associated with at least one of a location of the end device with respect to the plurality of edge nodes, a velocity of the end device with respect to the plurality of edge nodes, motion trend data associated with the end device, or motion trend data associated with the plurality of edge nodes.

24. A second edge node, comprising:
a processing system that includes one or more processors and one or more memories coupled with the one or more processors, the processing system configured to cause the second edge node to:
obtain, from a first edge node of a plurality of edge nodes or an end device, an indication of an assignment of a processing task to the second edge node, wherein the assignment of the processing task to the second edge node is in accordance with one or more parameters associated with the processing task and network link information associated with a wireless communication link between the end device and the second edge node from among a plurality of wireless communication links between the plurality of edge nodes and the end device; and
output, to one or both of the first edge node or the end device, information associated with the processing task in accordance with the one or more parameters associated with the processing task.

25. The second edge node of claim 24, wherein the processing system is further configured to cause the second edge node to:
obtain, from the first edge node or the end device, a query indicating the one or more parameters associated with the processing task; and
output, to the first edge node or the end device, an indication of an expected completion time for the processing task, wherein the assignment of the processing task to the second edge node is according to the expected completion time.

26. The second edge node of claim 24, wherein the one or more parameters comprise at least one of a quality of service (QoS) threshold associated with the processing task, a payload size associated with the processing task, a compute time associated with the processing task, a priority of the processing task, a workload type of the processing task, a latency threshold for the processing task, rendering information associated with the processing task, resolution information associated with the processing task, or a security requirement for the processing task.

27. The second edge node of claim 24, wherein:
the second edge node queues the processing task in a processing pipeline of the second edge node in accordance with obtaining the indication of the assignment of the processing task to the second edge node, and
the processing task comprises at least one of a compute task, an input/output (I/O) task, or a network addressable storage (NAS) task.

28. A method for edge compute resource orchestration of end device processing tasks at a first edge node, comprising:
receiving, from an end device, network link information associated with a plurality of wireless communication links between the end device and a plurality of edge nodes;

receiving, from the end device, a request associated with a processing task, wherein the request indicates one or more parameters associated with the processing task; and transmitting, to a second edge node of the plurality of edge nodes, an indication of an assignment of the processing task to the second edge node in accordance with the network link information associated with a wireless communication link between the end device and the second edge node and in accordance with the one or more parameters associated with the processing task.

29. The method of claim 28, further comprising:
transmitting coherency information to the plurality of edge nodes to maintain coherency across the plurality of edge nodes if the first edge node goes offline or becomes disconnected from the plurality of edge nodes.

30. The method of claim 28, further comprising:
transmitting, to each of the plurality of edge nodes, an indication of the one or more parameters associated with the processing task; and
receiving, from one or more of the plurality of edge nodes, an indication of an expected completion time for the processing task, wherein the assignment of the processing task to the second edge node is according to the expected completion time.

31. The first edge node of claim 1, wherein the network link information indicates a respective battery level corresponding to each of the plurality of edge nodes, and wherein the assignment of the processing task to the second edge node is in accordance with the respective battery level corresponding to each of the plurality of edge nodes.

32. The end device of claim 18, wherein the network link information indicates a respective battery level corresponding to each of the one or more plurality of edge nodes, and wherein the information associated with the processing task is obtained in accordance with the respective battery level corresponding to each of the plurality of edge nodes.

33. The second edge node of claim 24, wherein the network link information indicates a respective battery level corresponding to each of the plurality of edge nodes, and wherein the assignment of the processing task to the second edge node is in accordance with the respective battery level corresponding to each of the plurality of edge nodes.

34. The method of claim 28, wherein the network link information indicates a respective battery level corresponding to each of the plurality of edge nodes, and wherein the assignment of the processing task to the second edge node is in accordance with the respective battery level corresponding to each of the plurality of edge nodes.

* * * * *